(12) United States Patent
Lobaz et al.

(10) Patent No.: US 12,404,989 B2
(45) Date of Patent: Sep. 2, 2025

(54) OPTICS FOR LUMINAIRES

(71) Applicant: IQS GROUP s.r.o., Husinec-Rez (CZ)

(72) Inventors: Petr Lobaz, Plzen (CZ); Zbynek Ryzi, Littleton, MA (US); Martin Nyvlt, Prague (CZ)

(73) Assignee: IQS GROUP s.r.o., Husinec-Rez (CZ)

( * ) Notice: Subject to any disclaimer, the term of this patent is extended or adjusted under 35 U.S.C. 154(b) by 0 days.

(21) Appl. No.: 18/005,071

(22) PCT Filed: Jul. 12, 2021

(86) PCT No.: PCT/EP2021/069324
§ 371 (c)(1),
(2) Date: Jan. 11, 2023

(87) PCT Pub. No.: WO2022/013147
PCT Pub. Date: Jan. 20, 2022

(65) Prior Publication Data
US 2023/0341108 A1    Oct. 26, 2023

(30) Foreign Application Priority Data

Jul. 13, 2020 (GB) ..................... 2010757

(51) Int. Cl.
*F21V 5/04*    (2006.01)
*F21V 7/04*    (2006.01)
(Continued)

(52) U.S. Cl.
CPC .............. *F21V 14/04* (2013.01); *F21V 5/045* (2013.01); *F21V 7/048* (2013.01); *F21V 7/28* (2018.02); *F21Y 2103/10* (2016.08)

(58) Field of Classification Search
CPC ............ F21V 5/045; F21V 7/048; F21V 5/02; G02B 5/0221; G02B 5/0231; G02B 3/08;
(Continued)

(56) References Cited

U.S. PATENT DOCUMENTS

| | | | | | |
|---|---|---|---|---|---|
| 5,944,405 | A | * | 8/1999 | Takeuchi | G02B 6/0051 |
| | | | | | 362/617 |
| 2002/0034710 | A1 | * | 3/2002 | Morris | G02B 5/0221 |
| | | | | | 430/945 |

(Continued)

FOREIGN PATENT DOCUMENTS

| | | |
|---|---|---|
| DE | 102012005826 | 9/2013 |
| WO | WO 2014/045142 | 3/2014 |

OTHER PUBLICATIONS

Intellectual Property Office: Search Report, App. No. GB2010757.9 (Apr. 6, 2021).
(Continued)

*Primary Examiner* — Omar Rojas Cadima
(74) *Attorney, Agent, or Firm* — Walters & Wasylyna LLC

(57) ABSTRACT

An optical element (1) for use in a luminaire, especially a linear luminaire, for creating a prescribed output light distribution pattern from light emitted by a light source at a predetermined location relative to the optical element (1), the optical element (1) comprising a body including a surface which comprises a faceted structure (3), the faceted structure (3) comprising one or more strips or rows (6) each comprising a plurality of primary facets (4), wherein, for any given strip or row (6) of primary facets (4): (i) each respective primary facet (4) within the given strip or row (6) is configured such that it redirects light from a respective input direction associated with that primary facet (4) into a respective output direction associated with that primary facet (4); (ii) each respective primary facet (4) within the given strip or row (6) is configured such that light propagating therefrom in a said respective output direction associated with that primary facet (4) contributes to the prescribed output light distribution pattern; and (iii) the respective primary facets (4) within the given strip or row (Continued)

(6) are configured such that: the distribution of the respective output directions associated with the respective primary facets (4) in the given strip or row (6) has a random or quasi-random character with respect to the positions of the respective primary facets (4) in the given strip or row (6), and the random or quasi-random character of the distribution of the respective output directions associated with the respective primary facets (4) in the given strip or row (6) is defined by a probability density function correlating with the prescribed output light distribution pattern and not with the positions of the respective primary facets (4) in the given strip or row (6).

23 Claims, 12 Drawing Sheets

(51) Int. Cl.
  *F21V 7/28*    (2018.01)
  *F21V 14/04*   (2006.01)
  *F21Y 103/10*  (2016.01)

(58) Field of Classification Search
  CPC .... G02B 5/09; G02B 19/0066; G02B 3/0043; F21Y 2103/10
  See application file for complete search history.

(56) References Cited

U.S. PATENT DOCUMENTS

2004/0130790 A1* 7/2004 Sales ................. G02B 27/0961
                                                    359/619
2008/0037257 A1* 2/2008 Bolta ....................... F21V 9/40
                                                    362/294

OTHER PUBLICATIONS

International Searching Authority: International Search Report and Written Opinion, Intl. App. No. PCT/EP2021/069324 (Sep. 30, 2021).

* cited by examiner (a)  (b)

(a)                               (b)

OPTICS FOR LUMINAIRES

PRIORITY

This application is the U.S. national phase entry of Intl. App. No. PCT/EP2021/069324 filed on Jul. 12, 2021, which claims priority from GB2010757.9 filed on Jul. 13, 2020. The entire contents of PCT/EP2021/069324 and GB2010757.9 are incorporated herein by reference.

TECHNICAL FIELD

This invention relates to optics for luminaires, more particularly (though not exclusively) to optical elements embodying novel optics for use in luminaires, especially linear luminaires. Even more particularly (though not exclusively) the invention relates to optical elements primarily for use in linear luminaires, and to methods for designing and producing such optical elements, which are based on novel optics and optical components which provide novel light redistribution and diffusion functions.

BACKGROUND OF THE INVENTION AND PRIOR ART

As used herein, the term "luminaire" means a complete lighting unit comprising a lamp or lamps, or one or more other types of light source, together with various other structural and/or optical components which are designed to connect the lamp(s)/light source(s) to a power supply, to position and protect the lamp(s)/light source(s), and to distribute the light emitted by the lamp(s)/light source(s) into a desired light output distribution or pattern. Such "luminaires" may be utilised for light applications in a wide range of scenarios and settings, including for example: industrial and commercial premises, offices and other workplaces, public buildings, private premises of various kinds, and also domestic settings, as well as others.

Since the invention of the fluorescent tube, as a more efficient alternative to an incandescent light bulb, luminaires utilizing such tubes have become worldwide standard lighting devices, mainly for illumination of workplaces, halls, corridors or hallways, and they have found applications also in homes and many other places.

In many cases these tube-based lighting devices take the form of a linear luminaire, which is substantially elongated in one direction, comprising typically one or two parallel fluorescent tubes. The fluorescent tubes in luminaires often come in combination with some kind of additional optical element(s) which help to deliver emitted light to a target illumination area or prevent light reaching other areas, and these optical elements are sometimes designed to make the visual appearance of the luminaire more pleasing, for example by reducing glare.

Owing to the elongated nature of the fluorescent tube, the optics of the luminaire also often come in elongated form, or more specifically its optical function is often more-or-less uniform along the tube's length. In general, there are three basic types of optical elements associated with such luminaires based on fluorescent tubes that are used worldwide:

(i) The first type is generic diffusers. Such diffusers are often part of the luminaire cover and have a larger width than the fluorescent tube. Their optical function is to scatter the incident light uniformly (i.e. without creating any directionality of the outputted light, similarly to the tubes alone), and owing to their larger area the observer does not see glaring light coming from a thin and very bright tube, but rather moderately bright light coming from a larger area, hiding the originally glaring tubes.

(ii) The second type is optics comprising micro-optical features, i.e. one- or two-dimensional objects with a specific relief profile shape, e.g. prismatic features, lenses, zonal (e.g. Fresnel) lenses or features (see, for example, U.S. Pat. Nos. 2,640,149A, 5,274,536, 6,213,625B1) which typically help to reduce the angular width of the light emitted from the luminaire or to reduce glare or to deliver light more efficiently to a target area.

(iii) The third type of optics are reflective surfaces or reflectors (for example as disclosed in U.S. Pat. No. 2,565,435A, EP0214535A2, U.S. Ser. No. 10/101,007), which again are shaped in one or two dimensions, and which collect and/or redirect light from the fluorescent tube, reduce the angular width of the light distribution or homogenize a target illumination area, and often also prevent the propagation of light to higher angles in order to reduce glare.

With the arrival of light emitting diodes (LEDs) as light sources for illumination purposes within the past decade, many optical approaches to how to distribute LED light have had to be redefined. In some cases the originally fluorescent tube-based luminaires were retro-fitted with a linear arrangement of LEDs as the light source together with specifically designed optics. One such solution is described, for example, in U.S. Pat. No. 9,291,330B2. This solution comprises the use of classical linear or lens-based optics for processing the LED light. Similar optics for linear LED-based luminaires can be found also in US2012/0275150A1 and US2016/0238202A1.

However, given that classical optical elements require relatively large material volumes, they are often replaced with Fresnel or zonal optics which use less material for comparable optical functionality. Examples of solutions tailored to linear luminaires that utilize linear Fresnel lenses or prismatic structures can be found, for example, in U.S. Pat. Nos. 9,109,777, 9,765,949B2 and 7,559,672B1.

Both types of solution mentioned above use classical or free-form linear lenses or faceted Fresnel prismatic or micro-prismatic lenses, which work on the principle of redirecting incident light, typically by means of refraction, into a specific direction depending on the location at which the incident light interacts with the optical element. This is an efficient way of narrowing the light distribution angle or redirecting light to a specific target illumination area. Furthermore, all these known elements can provide well-defined light distributions (meaning that they redistribute light into desired angular directions with high precision). However, since each specific area on the surface of the optical element sends the incident portion of light from a given light source (i.e. one LED) into one direction (or a small angular range), it can be perceived by a viewer as unpleasantly bright or a glaring spot. This is undesirable.

Similarly to luminaires based on fluorescent bulbs, diffusers can be used in linear LED-based luminaires as well. As described above, generic diffusers can reduce glare, but since LED-based luminaires tend to be much smaller (or narrower) than fluorescent tube-based luminaires, the light emitted from such a diffuser may still be actually very bright, even comparably to the case of diffusers used with fluorescent tubes. This often requires further reduction of glare, in particular when the luminaire is viewed from higher observation angles. This can be achieved with glare reducing micro-structured diffusers, which typically limit the amount of emitted light to higher angles. Again, due to the smaller size or width of LED-based linear luminaires, it is desirable that the size of the micro-features of such diffusers is also reduced in order to achieve a "smoother" or more pleasing appearance. This may offer glare reduction or beam shaping properties, i.e. capable of creating specific light distributions. Both of these diffuser types can be found described, for example, in U.S. Ser. No. 10/317,583B2 and US2017/0146214A1, respectively.

Yet another diffuser type, such as Luminit [trade mark] beam shaping diffusers, may also provide shaped (e.g. elongated) illumination spots. These diffusers use organized or randomized micro-structure features with a specific shape or surface modulation, which scatter light into a limited range of angles. Similarly to generic diffusers and contrary to linear lenses or prismatic structures, their optical function is generic across their surface, and not designed for a specific type of incident light (i.e. angle of incidence).

Known generic or micro-structured diffusers as described above are sometimes used in combination with classical linear lenses or linear Fresnel lenses or prismatic structures in order to reduce their undesirable glare or to smooth out (i.e. homogenize) luminance (i.e. brightness) across their emission area. This can be done by adding another diffuser, or adding a light scattering surface (see, for example, U.S. Pat. No. 9,765,949B2, FIG. 1 thereof), or by using a material with scattering properties (e.g. as described in U.S. Pat. No. 8,619,363B1).

However, despite the above known advances in the art of luminaires in recent years, the ability of known linear luminaire elements and optical arrangements to produce desired or predetermined light outputs or distribution patterns is still limited, and there is still a marked need for improvement in being able to design and produce linear luminaires that provide high precision light redistribution and diffusion functions in a more efficient manner and which better meet the practical lighting needs and requirements of users.

SUMMARY OF THE INVENTION

In view of the above, a primary object of the present invention is to provide optical elements primarily for use in linear luminaires, and methods for such optical elements' design and production, which incorporate novel optics and optical components which provide improved high precision light redistribution and diffusion functions that are inherent in the design and construction of such optical elements in their own right.

Thus, the present invention is predicated on a novel design and construction of optical element, primarily intended for use in linear luminaires, which addresses the prior art problem of how to combine high precision light redistribution and diffusion functions into an optical element that may be used to good effect to such ends in its own right, without relying on conventional optics or ancillary components such as diffusers to achieve same. At one basic level, the present invention does this using a unique design of a structured optical surface of the optical element.

Accordingly, in a first aspect the present invention provides an optical element for use in a luminaire for creating a prescribed output light distribution pattern from light emitted by a light source at a predetermined location relative to the optical element, the optical element comprising a body including a surface which comprises a faceted structure, the faceted structure comprising one or more strips or rows each comprising a plurality of primary facets, wherein, for any given strip or row of primary facets:
(i) each respective primary facet within the given strip or row is configured such that it redirects light from a respective input direction associated with that primary facet into a respective output direction associated with that primary facet;
(ii) each respective primary facet within the given strip or row is configured such that light propagating therefrom in a said respective output direction associated with that primary facet contributes to the prescribed output light distribution pattern; and
(iii) the respective primary facets within the given strip or row are configured such that:
the distribution of the respective output directions associated with the respective primary facets in the given strip or row has a random or quasi-random character with respect to the positions of the respective primary facets in the given strip or row, and
the random or quasi-random character of the distribution of the respective output directions associated with the respective primary facets in the given strip or row is defined by a probability density function correlating with the prescribed output light distribution pattern and not with the positions of the respective primary facets in the given strip or row.

As used herein, the expression "associated with that primary facet", as referring to the respective input direction and respective output direction in the above-defined first aspect, means that the association is defined by the design of the element's faceted structure, by associating any given primary facet with light propagating at a predetermined input direction (derived from the predetermined location of the light source relative to the optical element, thus also relative to the given primary facet) before impinging on the optical element and subsequently being incident on that primary facet, and further associating that primary facet with the output direction of light leaving the optical element into which the light incident on that primary facet was redirected, based on the interaction of the incident light with a specific configuration of that primary facet, and in order that it contributes to forming the predetermined output light distribution pattern.

As used herein, the term "plurality of primary facets" (or "plurality of facets", as the case may be) means such a number of primary facets (or facets) that it is reasonable to expect statistical properties of such primary facets (or facets) to be substantially unaffected by their exact count.

In many embodiments of the optical element of the above first aspect, the optical element may be an optical element for use in forming a linear luminaire, especially a linear luminaire comprising at least one light source, especially at least one linear light source.

In a second aspect the present invention provides an optical arrangement for use in forming a luminaire, especially a linear luminaire, the arrangement comprising:
an optical element according to the first aspect of the invention or any embodiment thereof, and
at least one light source, especially at least one linear light source, e.g. at least one linear strip or array of a plurality of LEDs.

In a third aspect the present invention provides a luminaire, especially a linear luminaire, comprising:
at least one optical element according to the first aspect of the invention or any embodiment thereof, and
at least one light source, especially at least one linear light source, e.g. at least one linear strip or array of a plurality of LEDs.

In practical embodiments of the preceding third aspect, in forming the luminaire one or more additional components may be employed in addition to the at least one optical element and that at least one light source, for example any suitable body or frame or housing within which the various other components of the luminaire may be mounted or housed. Any suitable known examples of such additional bodies, frames or housings may be used for this purpose.

Furthermore, in practising some such embodiments of the preceding third aspect, the optical element may have an overall configuration such that it can connect with or be mounted in a said body or frame or housing of a luminaire which further comprises the said light source, such that the predetermined location of the light source relative to the optical element may be ensured, especially automatically ensured for that optical element. For this purpose the optical element and/or the luminaire body, frame or housing may comprise one or more engagement or interengagement means (or attachment or connection features) to enable its attachment or connection to the luminaire body, frame or housing. For instance, the optical element may be configured such that it is receivable by a sliding motion into one or more, e.g. a pair of, grooves or channels formed in the luminaire body, frame or housing. Various other suitable engagement or interengagement means (or attachment or connection features) may alternatively be used instead.

In a fourth aspect the present invention provides a method of producing an optical element according to the first aspect of the invention or any embodiment thereof, the optical element being an optical element for use in a luminaire for creating a prescribed output light distribution pattern from light emitted by a light source at a predetermined location relative to the optical element, the optical element comprising a body including a surface which comprises a faceted structure, the faceted structure comprising one or more strips or rows each comprising a plurality of primary facets, the method comprising:
 (a) calculating the shape and configuration of each primary facet such that, for any given strip or row of primary facets:
  (i) each respective primary facet within the given strip or row is configured such that it redirects light from a respective input direction associated with that primary facet into a respective output direction associated with that primary facet;
  (ii) each respective primary facet within the given strip or row is configured such that light propagating therefrom in a said respective output direction associated with that primary facet contributes to the prescribed output light distribution pattern; and (iii) the respective primary facets within the given strip or row are configured such that:
   the distribution of the respective output directions associated with the respective primary facets in the given strip or row has a random or quasi-random character with respect to the positions of the respective primary facets in the given strip or row, and
   the random or quasi-random character of the distribution of the respective output directions associated with the respective primary facets in the given strip or row is defined by a probability density function correlating with the prescribed output light distribution pattern and not with the positions of the respective primary facets in the given strip or row; and
 (b) manufacturing the optical element with the primary facets of the faceted structure being according to the said calculated shape and configuration thereof.

In embodiment methods of the preceding fourth aspect, the calculated shape and configuration of the primary facets in the faceted structure resulting from step (i) may be or correspond to the physical shape and configuration of primary facets as defined or described hereinabove or hereinbelow in the context of embodiments of the optical element of the first aspect of the invention.

In some embodiments of the optical element of the invention the faceted structure may comprise a plurality of strips or rows of the said primary facets, wherein each strip or row comprises a plurality of the said primary facets.

In some embodiments the optical element may comprise a body in the form of a plate or sheet of material having a said surface, or alternatively a face, which carries or has formed thereon or therein the said faceted structure.

In some such embodiment forms the plate or sheet (or at least the said surface or face thereof) may be generally substantially flat or generally substantially planar. However, in other such embodiment forms the plate or sheet may be generally curved or arcuate, e.g. curved or arcuate in two or three dimensions. Other general shapes may alternatively be possible, for example an optical element that is wedge-shaped or a plate or sheet having one or more free-form shaped faces or surfaces, etc.

In some embodiment forms, the faces (especially major faces) of the plate or sheet may be separated by a generally substantially constant or uniform distance (or average distance).

In some embodiments the material of the body of the optical element may be substantially transparent to light in a desired wavelength range to be emitted by the luminaire, i.e. as emitted by the at least one light source. In some such embodiment forms the light to which the body material is substantially transparent may comprise light with wavelengths in the visible region of the spectrum.

In some such embodiments the material of the body of the optical element may comprise a transparent plastics or polymeric material, such as PMMA (polymethylmethacrylate), PC (polycarbonate) or PET (polyethylene terephthalate). Also, various epoxies, UV lacquers or UV-curable polymers may optionally be used as an additional component of such embodiment optical element materials.

Thus, in many practical embodiment optical elements according to the invention, the optical element may take the form of a transmission-type optical element, which comprises an above-defined body of light-transmissive material including the said surface which comprises the said faceted structure. However, it may still be within the overall scope of the invention for another embodiment optical element, still being according to the invention, to take the form of a reflective-type optical element, which comprises a body of a light-reflecting material, or a body coated with a light-reflecting material, including the said surface which comprises the said faceted structure, wherein if the body is one which includes at least one substantially light-reflecting surface, then that reflective surface may typically be (although it could alternatively be other than) the said surface with the said faceted structure.

In many embodiments of the invention in its various aspects, the optical element may be designed for use with an elongated or linear light source, e.g. a linear array of LEDs, especially with the longitudinal axes or directions of the optical element and the linear light source being designed to be generally substantially parallel to one another. As such, in many embodiments of optical element in accordance with the invention its overall optical function(s) may be substantially invariant in the direction of the elongation axis of such a linear light source, which is to say that the optical function(s) of the optics of the optical element may be not substantially dependent on a longitudinal offset position of the optics relative to the light source.

In some embodiments the body of the optical element may comprise one face or facial surface which carries or has formed thereon or therein the said faceted structure, optionally with an opposite face or facial surface which does not carry or have formed thereon or therein a said faceted structure. In some such embodiments, such a non-faceted face or facial surface of the body may be substantially flat or planar, or alternatively it may be curved or arcuate, e.g. so as to be locally substantially flat/planar at any given point thereon.

In some embodiments of the optical element the faceted structure may comprise a plurality of primary facets each being configured so as to have or exhibit a surface relief maximum width (i.e. a maximum width in a direction generally longitudinally along the strip or row) in a range of from about 100 or 200 or 300 or 400 or 500 or 1000 or 5000 nm up to about 10 or 20 or 30 or 40 or 50 or 60 or 70 or 80 or 90 or 100, or even up to about 200 or 300 or 400 or 500 or 1000 μm. Additionally or alternatively, each primary facet may be configured so as to have or exhibit a surface relief maximum depth or height in a range of from about 0 or 0.5 or 1 or 2 or 3 or 5 or 10 or 20 or 30 or 40 or 50 or 60 or 70 or 80 or 90 or 100 or 150 or 200 or 300 or 400 or 500 nm up to about 2 or 5 or 10 or 20 or 30 or 40 or 50 or 60 or 70 or 80 or 90 or 100, or even up to about 200 or 300 or 400 or 500 μm.

In some embodiments of the optical element a face or facial surface of the body other than, or a face or facial surface of the body opposite to, that face or facial surface which carries or has formed thereon the said faceted structure may be substantially flat or planar, or alternatively may be curved or arcuate, e.g. so as to be locally flat/planar at any given point thereon.

In some embodiments the faceted structure may comprise one or more strips or rows each comprising a plurality of primary facets, wherein each strip or row comprises a generally linear row or sequence or array of a plurality of primary facets which spans substantially the full transverse width, or a major proportion of the transverse width, of the optical element.

In embodiments the or each strip or row of primary facets may have a width (or maximum width) across the strip or row (i.e. across the strip/row transversely relative to its general length direction) in an approximate range of from about 100 or 200 or 300 or 400 or 500 or 1000 or 5000 nm up to about 25 or 50 or 100 or 200 or 300 or 400 or 500 or 1000 μm.

In some embodiment forms each such strip or row may be generally substantially straight. However, in some alternative such embodiment forms each such strip or row may be curved or arcuate or otherwise non-straight in two or three dimensions.

In some embodiments there may be defined between adjacent strips or rows a respective border or boundary. In some such embodiments one or more borders or boundaries between the strips or rows may be visible, by virtue of the primary facets within one of the adjacent strips or rows being not continuously connected to, nor being continuations of, primary facets within an immediately adjacent strip or row, i.e. a neighbouring strip or row either immediately thereabove or therebelow. However, in other such embodiments, or even in embodiments just defined above, one or more borders or boundaries between the strips or rows may be substantially invisible, by virtue of the primary facets within one of the adjacent strips or rows being continuously connected to, or being continuations of, primary facets within an immediately adjacent strip or row, i.e. a neighbouring strip or row either immediately thereabove or therebelow.

In the case of such alternative embodiments as defined immediately above in which a border or boundary between neighbouring strips or rows may be substantially invisible, this may alternatively be by virtue of that border or boundary being configured such that the respective neighbouring or adjacent edges of a first primary facet within a first strip or row and of a second primary facet within a second, adjacent strip or row, which first and second strips or rows lie at a common boundary between the said strips or rows, are substantially matched in, i.e. are of substantially or approximately the same, size and/or position and/or shape at least at, or in the vicinity of or in the respective portions of each primary facet that are located adjacent, that common boundary.

In some embodiments of the optical element, in any given strip or row of primary facets, substantially all of, or a majority of, the primary facets may collectively span substantially the full width of (i.e. width across) the strip or row and may be located next to each other, side by side, along the strip or row.

However, in some embodiments of the optical element, even in those embodiments defined in the preceding paragraph, in any given strip or row of primary facets:
(i) some of, especially some but not all of, or a minority of, the primary facets may span only part of the width of (i.e. only part of the width across) the strip or row and/or optionally be curved or twisted back on themselves (moving along the strip or row) towards one lateral edge of the strip or row; or
(ii) at least some of, especially some but not all of, or a minority of, or possibly even substantially all of, the primary facets may continuously transition from one to another to form a continuous faceted surface; or
(iii) at least some of, especially some but not all of, or a minority of, or possibly even substantially all of, the primary facets may transition from one to another with a step or discontinuity, in which case the boundary between any two such neighbouring primary facets of this species (iii) may be connected by an intermediate connecting or transition surface.

In some of those embodiments as in the preceding paragraph in which (iii) is satisfied, any said intermediate connecting or transition surface may either:
(i) not perform an optical function that contributes to the prescribed output light distribution pattern; or
(ii) act on light from a said input direction in such a way as to introduce optical noise into, or create diffuse light in, the prescribed output light distribution pattern.

In some embodiments of the optical element, in the faceted structure, each of the primary facets may comprise a curved surface or face, especially one that is substantially smooth, and whose shape may be defined by, especially to a good approximation by, a quadric surface, i.e. a portion of any of an ellipsoid, an elliptic paraboloid, a hyperbolic paraboloid, an elliptic hyperboloid, an elliptic cone, an elliptic cylinder, a hyperbolic cylinder, or a parabolic cylinder.

However, in certain other embodiment forms it may be possible for the shape of certain one(s) of, or at least some of, the primary facets in the faceted structure to be defined by, especially to a good approximation by, a simpler curved surface, such as a, or a portion of a, cylindrical, conical, spherical or bilinear surface, or perhaps even by a flat/planar surface. Other types of curved surface may also be possible in certain yet other embodiment forms.

In certain embodiments of the optical element of the invention, it may be possible for at least one or more of the primary facets of the faceted structure to be Fresnellated, meaning that the or the respective primary facet may be subdivided into a plurality of sub-facets (or sub-primary-facets) in the manner of a Fresnel lens, i.e. in a corresponding manner to how the structure of a Fresnel lens can in effect replace or duplicate the principal optical function of a convention lens but with a significantly smaller overall thickness of the optical body. Thus, in many such embodiments, the one or more primary facets that is/are Fresnellated may still at the macro level satisfy many of (or at least some of) the definitions given herein for various constructional and/or optical features of primary facet(s) of the faceted structure of optical elements according to embodiments of the invention, whilst the precise shape(s) and/or dimensions of individual sub-facets (or sub-primary-facets) of the Fresnellated structure at the micro level may be significantly (or even substantially) reduced in size and scale therefrom (e.g. with dimensions reduced in scale by a factor of at least about 2 or 3 or 4 or 5 or 10 or 15 or 20 or 30 or 40 or 50 or 100 or 200 or 300 or 400 or 500). Alternatively, in certain other such Fresnellated primary facet-type embodiments, individual sub-facets (or sub-primary-facets) of the Fresnellated structure at the micro level may each themselves be thought of and satisfy any (or even many of, or at least some of) the definitions given herein for various constructional and/or optical features of primary facet(s) of the faceted structure of optical elements according to embodiments of the invention.

In some embodiments of the optical element, in the faceted structure, the geometrical properties of each primary facet may be such that any given primary facet may redirect light emitted by the light source in a respective dominant input direction (as defined hereinbelow) that reaches that given primary facet into a given one of a plurality of different dominant output directions (as defined hereinbelow) associated with the primary facets in the faceted structure.

In many embodiment forms of optical element in accordance with the invention, each of the primary facets in the faceted structure may redirect light by virtue of substantially only or predominantly a refraction or a reflection optical function, i.e. substantially without any, or any appreciable, optical function being diffraction. Here, "diffraction" refers to a phenomenon that would be represented by several primary facets working in tandem in a way similar or corresponding to a diffraction grating, i.e. which cannot be predicted by either reflection or refraction.

In some embodiments of the invention in its various aspects, the optical element of the invention may be laminated, glued or attached onto another, secondary, optical component in the form of a secondary plate, sheet, layer, film, foil, substrate, or cover component, in order to form a unified composite optical element. Such a secondary optical component may or may not have an optical function of its own, and if it does, then that optical function of the secondary optical component may serve to impart any desired or appropriate secondary or auxiliary optical function to the final output light distribution pattern achieved by use of the unified composite optical element. For example, such a secondary optical component may act as a diffuser or serve to impart one or more colour effects, or the like. Such laminating, gluing or attaching may be by virtue of any suitable known lamination, bonding, adhesion, affixation, fusion or other technique (e.g. using known lamination, bonding or attachment materials, methods and apparatuses and/or known conditions of elevated temperature and/or pressure, if necessary), or alternatively by virtue of a simple abutment technique (e.g. using suitable mechanical attachment or connection means if necessary). In such embodiments, the lamination, bonding or attachment of the optical element of the invention may be via its non-faceted surface/face. Once laminated/bonded/attached, the optical element of the invention and the secondary optical component may be either separable (or readily separable) or non-separable (or non-readily-separable) from one another.

In broad terms, in many embodiments of the optical element of the invention, such embodiment optical elements may be broadly characterized by the fact that, for any given strip or row of primary facets, each respective primary facet within the given strip or row may be configured such that it redirects light from a respective (especially respective dominant) input direction associated with that primary facet into a respective (especially respective dominant) output direction associated with that primary facet. Thus, in referring to such "dominant" input and output directions associated with each primary facet, it may be possible in various embodiments for each respective primary facet within the given strip or row to be configured such that it redirects light from a respective range of (or a plurality of different individual) input directions associated with that primary facet into a respective range of (or a plurality of different individual) output directions associated with that primary facet.

Moreover, each respective primary facet within the given strip or row may be configured such that light propagating therefrom in a said respective (especially respective dominant, where a range or plurality is involved) output direction associated with that primary facet contributes to the prescribed output light distribution pattern. Such embodiment optical elements may be furthermore broadly characterized by the fact that, for any given strip or row of primary facets, the respective primary facets within the given strip or row are configured such that: the distribution of the respective (especially respective dominant, where a range or plurality is involved) output directions associated with the respective primary facets in the given strip or row has a random or quasi-random character or property with respect to the positions of the respective primary facets in the given strip or row, and the random or quasi-random character or property of the distribution of the respective (especially respective dominant, where a range or plurality is involved) output directions associated with the respective primary facets in the given strip or row is defined by a probability density function correlating with the prescribed output light distribution pattern and not with the positions of the respective primary facets in the given strip or row.

The above-mentioned randomness (or quasi-randomness) principle may alternatively be manifested in another attribute of some embodiment optical elements, which is that any given area of the optical element mounted in a luminaire may itself create a substantial part of the overall prescribed output light distribution pattern, comprising output directions randomly distributed across all, or substantially all, or at least some of or a major proportion of or most of, the output directions within the output light distribution pattern, where the said area is significantly larger than an average area of a primary facet within that area of the optical element.

It should be emphasized that, in practice, it may be difficult to judge whether a certain distribution of primary facets, output directions, etc is truly random, since even a perfectly regular distribution of primary facets, output directions, etc may be considered as a manifestation of randomness, although an extremely rare case. Such cases should be considered as degenerate and should be excluded from what is meant by "random"/"randomness" in the context of the present invention. Here, in the context of the present invention, "random" or "quasi-random" (and their corresponding grammatical terms) refer to the fact that there is no obvious rule that dictates a primary facet's shape, or an output direction's direction, etc with respect to e.g. position on/in the optical element. When in doubt, "randomness" can be checked using standard methods of the art, such as the chi-square test or the Kolmogorov-Smirnov test.

Accordingly, in its broadest terms, the optical element according to the present invention comprises a structured surface composed of primary facets, which in embodiments may be a micro- and/or nano-structured surface composed of such primary facets. The optical function of the faceted structure, and thus the optical function of the optical element, can be explained and better understood by the following further technical background, with reference to FIGS. 1 to 4 of the accompanying drawings:

As shown schematically in FIG. 1, it is a well-known fact that a ray R of light passing from a light source S through a flat or locally flat plate O of a transparent material does not change its direction. Here, "flat" means that the first (i.e. front or upstream) and the second (i.e. rear or downstream) surfaces A, B of the plate are planar and parallel to each other. The term "locally flat" means that the first and second surfaces are curved (i.e. non-planar), but the distance between them is substantially constant, and that the curvature of the surfaces is substantially small compared to the thickness of the plate. It follows that both the first and second surfaces of a locally flat plate are still (or for most or all practical purposes) substantially planar and parallel in the close neighbourhood of an arbitrary point on the plate, as illustrated in FIG. 1. Thus, in the present disclosure, "locality" is assumed in the context of any reference to "flat" or "planar" or corresponding terminology, unless expressly stated otherwise.

It is also a well-known fact that if the first and the second surfaces of the plate are not parallel, then light passing through the plate changes its direction according to the law of refraction. There are two important practical cases of this, as illustrated in FIG. 2:

(i) When both surfaces of the plate are perfectly planar but not parallel to each other, i.e. the plate has a shape of a wedge W, light passing through the plate changes its direction, but not its divergence. An example of such a plate is an optical prism W.
(ii) When the curvatures of both surfaces of the plate differ, the divergence of the light changes. An example of such a plate is a lens L.

Traditional two-surface optical elements such as prisms or lenses employ smooth surfaces. In order to redirect light passing therethrough in a specified way, both surfaces must be carefully designed: their curvature and parallelism or non-parallelism are of utmost importance. Prescribed curvatures and other surface features are usually achieved by varying the optical element thickness. This, together with the requirement of smooth surfaces, leads to optical elements whose thickness may vary substantially, for example the thickness of a lens is substantially different at its center as compared with at its edges. Owing to the significantly variable thickness, such optical elements usually require a considerable volume of material for their manufacture. This makes such optical elements expensive, difficult to manufacture, among other practical disadvantages.

A well-known technique for reducing the thickness of an optical element whilst retaining its optical properties is attributed to A.-J. Fresnel. This is based on the observation that by removing the bulk of the material from inside the element whilst keeping a thin shell of the element in the proximity of the surfaces and flattening the result, neither the curvature nor the parallelism of the surfaces is changed. Thus, the basic optical function of the element is mostly kept intact. Such an optical element can be easier to manufacture, and it can be cheaper, lighter, etc. As illustrated in FIG. 3(a), for example, such a process applied to a wedge-type element results in an optical element whose one surface is flat, while the other surface is composed of small triangular prisms Pr, in which the orientation of the "primary" facets of the prisms is the same as the orientation of the corresponding surface of the original wedge. "Secondary" facets of the prisms Pr cause various optical artifacts not present in the optical behaviour of the original wedge. In practice, the advantages of such a Fresnel-like optical element often outweigh such artifacts. Another well-known example of the application of the Fresnel principle is illustrated in FIG. 3(b), which illustrates the application of the Fresnel process to a conventional lens. The resulting "Fresnel lens" is an optical element whose one surface is flat, whilst the other surface is composed of concentric rings. A cross-section of a ring can be considered as a triangle. Its primary edge is a curve that was once part of the cross-section L of the original lens. However, its secondary edge was not present in the original lens and it again causes various optical artifacts not present in the optical behavior of the original lens. It is also possible to say that the structured surface of the Fresnel lens is composed of curved prisms.

Clearly, it is possible to design a Fresnel-like optical element that can modify light passing through it in a variety of ways. Such an optical element has two optical surfaces. At least one of them is composed of facets. The facets may form straight or curved prisms or other solids. The facets may be planar or curved, either to a small degree of to a large degree. Such facets of a Fresnel-like optical element are illustrated by way of example in FIG. 4. Such a freedom in how to design such facets of a Fresnel-like optical element can however lead to ambiguity, since for a given optical behaviour it may be possible to design many substantially different optical components whose optical function is substantially the same.

However, the present invention presents an optical element with a novel form of distribution and shape of primary facets that through its design is capable of providing optical behaviour which may closely match a predetermined or prescribed optical behavior, whereby it is possible to design and produce optical elements that may exhibit a wide variety of predetermined or prescribed overall optical functions, in particular their light redistribution and diffusion behaviours.

Several primary aspects and various practical embodiments of the invention, and in particular some of the main features thereof, have already been broadly defined above. However, further embodiments and features of various embodiment forms of optical element within the scope of the invention will be apparent from the detailed description of same hereinbelow, which is to be read with reference to the remainder of the accompanying drawings.

As used herein, the term "light" is used in a broad sense to refer to electromagnetic radiation in any region or portion of the electromagnetic spectrum. In many embodiments of the various aspects of the invention, the light to be emitted by any relevant light source(s) and/or to be processed and/or redistributed by embodiment optical elements in accordance with embodiments of the present invention may be light within the visible region of the electromagnetic spectrum. In particular, in many embodiments it may be white light, or alternatively it may be light of a selected range or band of frequencies/wavelengths within the visible region. Alternatively, however, light which includes at least a portion that falls outside the visible region of the spectrum, e.g. in the infrared or ultraviolet regions, may be used instead, if desired.

Within the scope of this specification it is envisaged that the various aspects, embodiments, examples, features and alternatives, and in particular the individual constructional, configurational or operational features thereof, set out in the preceding paragraphs, in the claims and/or in the following description and accompanying drawings, may be taken independently or in any combination of any number of same. For example, individual features described in connection with one particular embodiment, or described singly or in combination with another feature in any one or more embodiments, are applicable on their own or in combination with one or more other features to all embodiments and may be found and used in combination with any other feature in any given embodiment, unless expressly stated otherwise or such features are incompatible.

BRIEF DESCRIPTION OF THE DRAWINGS

Various features and embodiments of the present invention in its various aspects will now be described in detail, by way of example only, with reference to the accompanying drawings, in which.

DETAILED DESCRIPTION OF THE INVENTION AND ITS EMBODIMENTS

Figure 1:
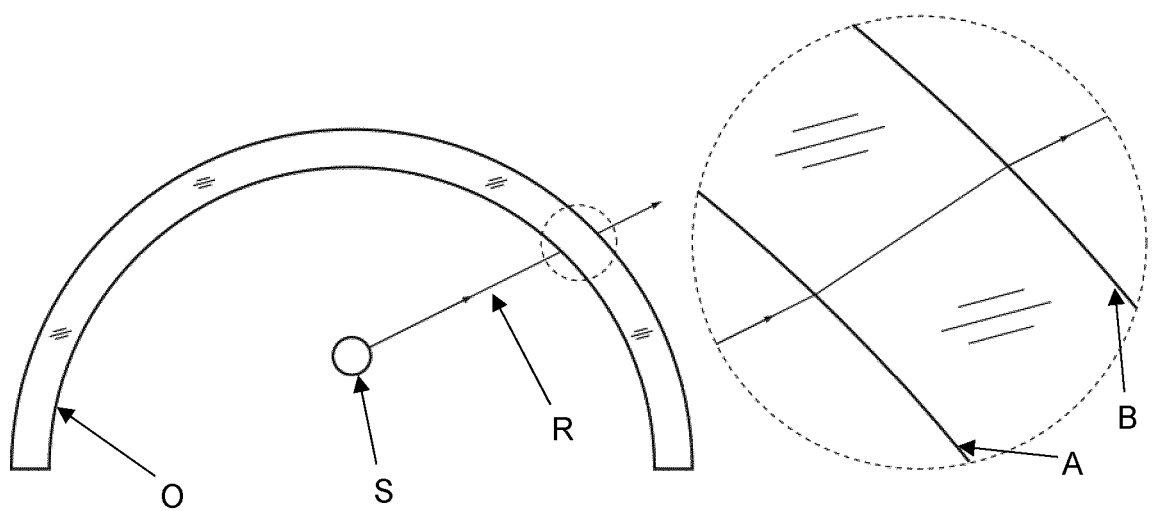
FIG. 1 is a schematic illustration explaining how light passes through a locally flat plate type of optical element.
Figure 2:
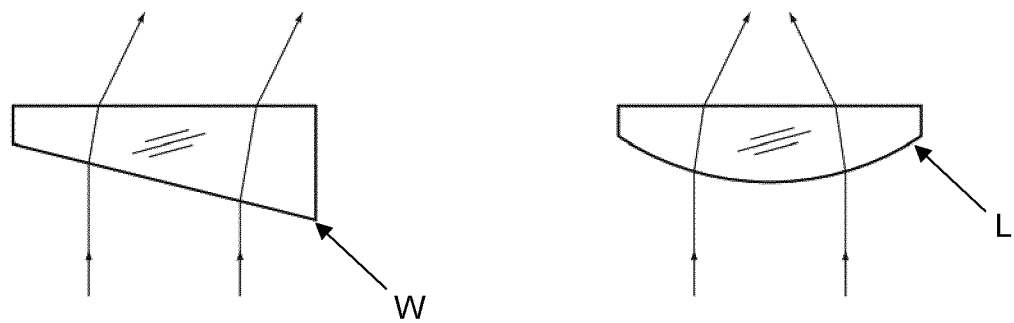
FIG. 2 is a schematic illustration explaining how light passes through a wedge type of optical element and a conventional convex lens.
Figure 3:
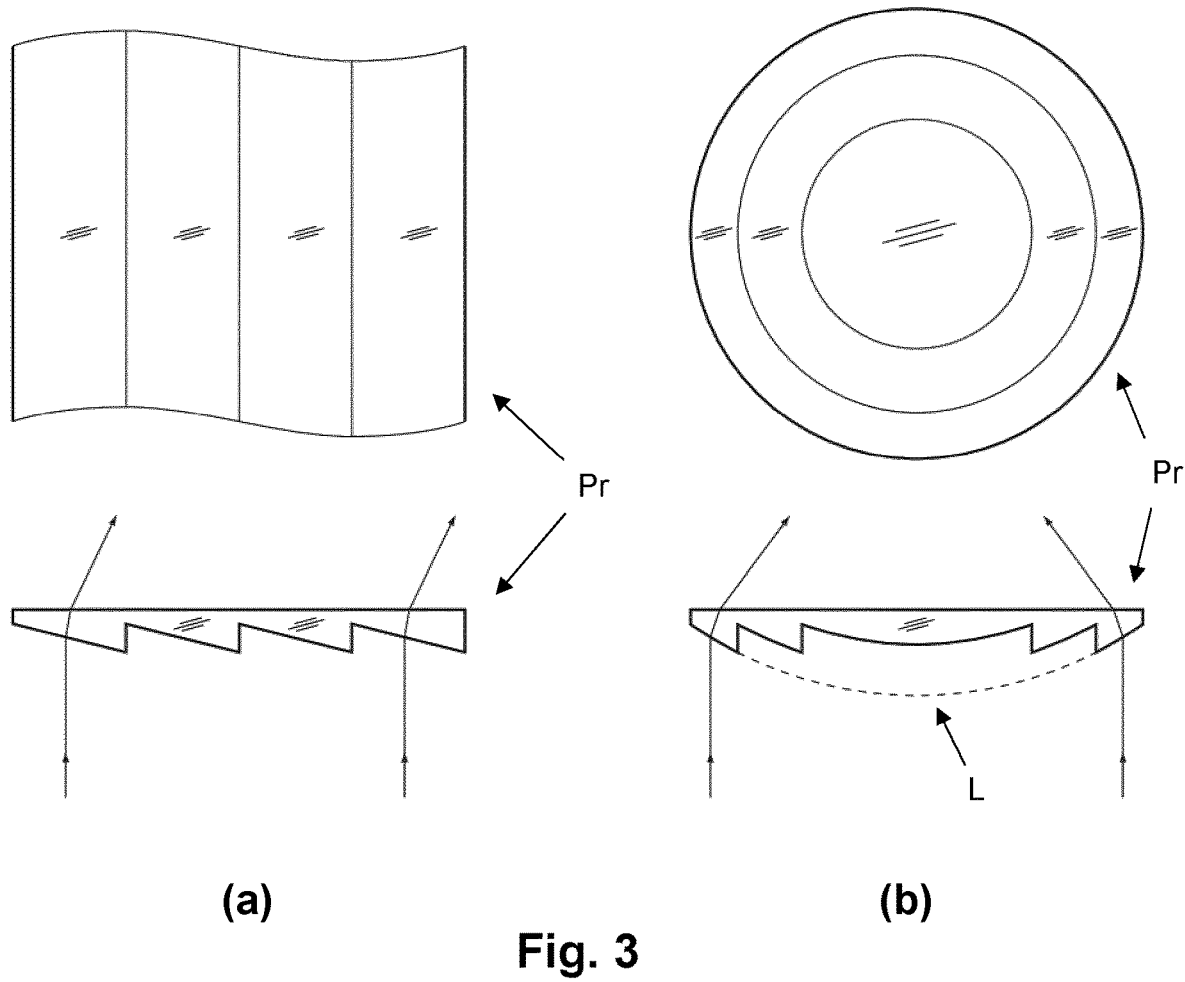
FIGS. 3(*a*) & (*b*) are schematic illustrations explaining how light passes through (a) a Fresnel-like wedge, and (b) a Fresnel lens.
Figure 4:
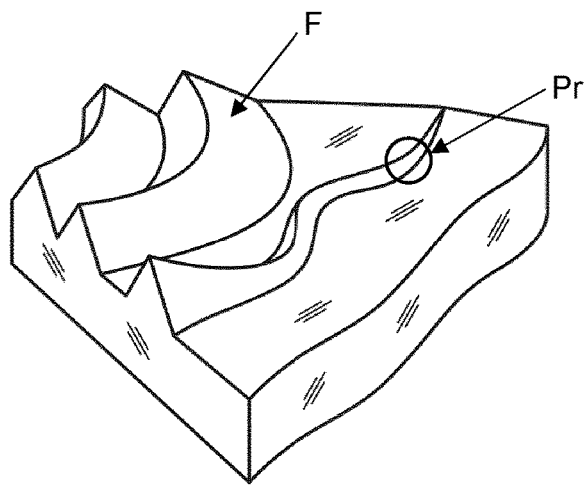
FIG. 4 is a schematic illustration explaining the structural appearance of facets and associated prism-like features of a Fresnel-like optical element.
Figure 5A:
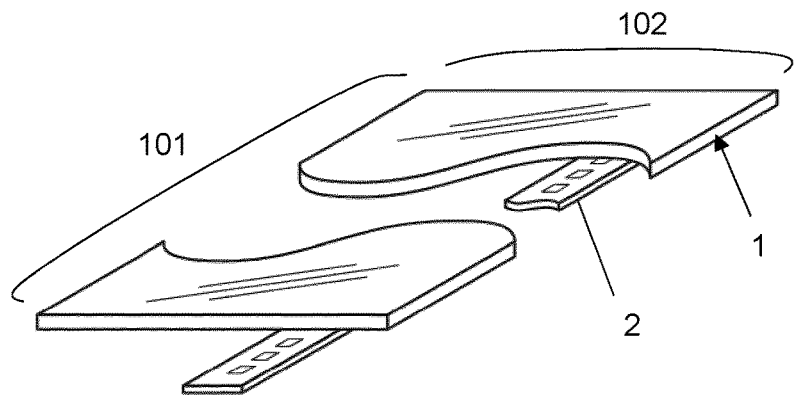
FIGS. 5(*a*) & (*b*) are schematic perspective views of two basic optical arrangements each incorporating a respective embodiment optical element according to the present invention.
Figure 5B:
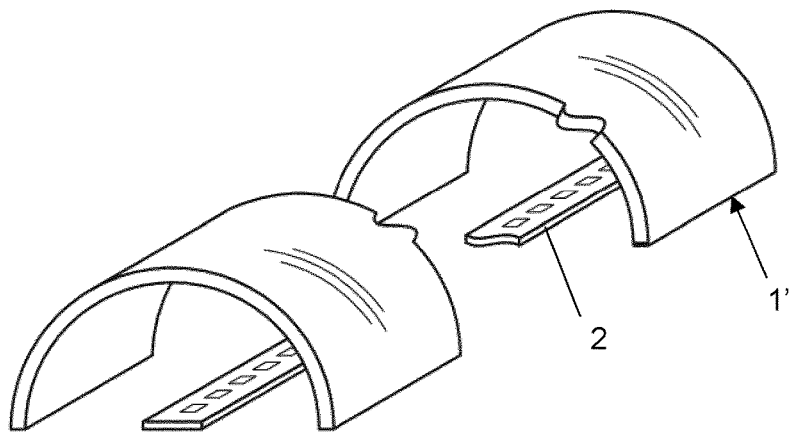

Referring firstly to FIGS. 5 to 10, and beginning with reference to FIGS. 5(a) & 5(b), typical embodiments of the present invention relate primarily to applications in the lighting industry, more specifically to luminaires, and to novel forms of optical elements 1, 1' for use therein. Such optical elements 1, 1' have a particular length 101 and width 102 (as shown for optical element 1 in FIG. 5(a)), which through their optical transmission or reflection function transform light originating from a light source 2—e.g. typically an elongated light source, such as a linear strip or array of LEDs—into a desired or predetermined (or prescribed) light distribution pattern at their output, while the light source 2 is located at a predetermined position relative to the respective optical element 1, 1'.

The elongated (or linear) light source, e.g. linear array of LEDs, fluorescent tube etc, may be approximated or described as a linear light source which emits the same light distribution from every point on its elongation axis (i.e. its longitudinal axis). This type of approximation may be easily applied, for example, to a fluorescent tube, and is often applied even to discrete light sources arranged in linear arrays, e.g. linear arrays of LEDs (with spaces between them) or even plural rows of linear arrays of LEDs. This approximation is often used in the design of linear luminaires (i.e. luminaires with a linear light source) comprising optics whose optical function is not substantially dependent on a longitudinal offset position of the optics relative to the light source. In other words, the optical function of such an element is substantially invariant in the direction of the light source's elongation axis. Optical elements according to embodiments of this invention may be designed using the above-described approximation of a linear light source, and their optical function(s) may thus be substantially invariant in the direction of the elongation axis of such a linear light source.

Optical elements according to embodiments of this invention may be designed to transform light originating from a light source, especially a linear light source, into a predetermined output light distribution primarily in a single given plane. In the case of a linear light source (or its approximation) it may often be the light distribution in a plane substantially perpendicular to the light source's elongation axis which is considered for transformation into the output light distribution.

Among typical light distributions emitted by linear light sources, but not only linear light sources, may be mentioned uniform and (semi-) Lambertian light distributions, especially in the direction perpendicular to the light source's elongation axis (in the context of linear luminaires which often specify light distributions in the C0-180° plane).

In the lighting industry light distributions (e.g. of the light source, LED(s), or luminaire) may typically be represented or described by so-called candela plots, showing the intensity of light in dependence on the propagation direction, i.e. the radiation angle, and they are often available in standardized photometric IES or LDT data formats. Photometrics data of light sources or light distribution devices (such as LEDs, luminaires or components for luminaires) describe typical distributions of light at the output of such sources or devices which can be measured at a suitable distance from them (typically at a distance larger or considerably larger (e.g. at least about 5 or 10 times larger) than their characteristic respective dimension(s)).

Typical optical elements according to embodiments of the invention—in particular or especially those of the transmission type—may take the general form of either a flat (or generally planar) or a curved or arcuate (in two or three dimensions) plate or sheet, made out of material transparent to light in a desired wavelength range, e.g. typically visible light substantially across the whole of the visible region of the spectrum. Suitable transparent plastics/polymeric materials include PMMA (polymethylmethacrylate), PC (polycarbonate) or PET (polyethylene terephthalate). Various epoxies, UV lacquers or UV-curable polymers may optionally be used as well, if desired or appropriate. In some embodiment forms, the faces (especially major faces) of the plate or sheet may be separated by a generally substantially constant or uniform distance (or average distance). Such an optical arrangement based on a flat plate form of optical element 1 is shown in FIG. 5(a), whilst FIG. 5(b) shows a corresponding arrangement based on a curved, e.g. half-cylindrical, optical element 1'. However, other general shapes or configurations of optical element in accordance with other embodiments of the invention may also be possible, for example, an optical element in the form of a wedge or having free-form shaped faces or surfaces, etc.

As shown in FIG. 5(a), in many embodiments of the invention the optical element 1 (or 1') may be elongated in one direction, e.g. having length 101 and width 102, and it may be used in an arrangement further comprising a linear light source 2, where the longitudinal axes of the optical element 1, 1' and the linear light source 2 are parallel.

As shown in FIGS. 6(a) & 6(b), either one of two opposite facial surfaces of such an optical element plate 1 may carry a faceted structure 3, comprising a plurality of facets 4. In each optical element 1 the characteristic faceted face/surface is labelled Fa, whilst the opposite, (typically) substantially flat, face/surface is labelled FI. The preferred size of the facets is small relative to the distance from which the optical element can be observed or viewed in a typical lighting application (e.g. office lighting), so that the amount of light emerging from a particular facet in a direction towards the observer is not perceived as blinding (or glaring) or unpleasantly bright. Also, smaller facets may create a smoother appearance of the optical element's surface, which may be more pleasing to the observer. Smaller facets may also lead to faceted structures which are shallower and ultimately need less material to be produced and at the same time provide a comparable optical function compared to standard conventional optics or micro-optical elements with large feature sizes. Also, shallower structures may be produced effectively in large volumes using techniques for mass production of surface relief structures.

Accordingly, each facet 4 of the faceted structure 3 may typically have a surface relief feature maximum width 501—i.e. a maximum lateral or transverse width 501 in a direction substantially parallel to the general width direction across the plate 1—of several tens or hundreds of micrometers (microns) down to several hundreds of nanometers, e.g. a maximum lateral or transverse width in a range of from about 100 or 200 or 300 or 400 or 500 or 1000 or 5000 nm up to about 10 or 20 or 30 or 40 or 50 or 60 or 70 or 80 or 90 or 100, or even up to about 200 or 300 or 400 or 500 or 1000 μm. Additionally or alternatively, each facet of the faceted structure may typically have a surface relief feature maximum depth or height 502 of several tens or hundreds of micrometers (microns) down to a few or a few tens of nanometers (or even down to near-zero), e.g. a maximum depth/height in a range of from about 0 or 0.5 or 1 or 2 or 3 or 5 or 10 or 20 or 30 or 40 or 50 or 60 or 70 or 80 or 90 or 100 or 150 or 200 or 300 or 400 or 500 nm up to about 2 or 5 or 10 or 20 or 30 or 40 or 50 or 60 or 70 or 80 or 90 or 100, or even up to about 200 or 300 or 400 or 500 μm.

The non-faceted facial surface FI of the plate 1 may typically be substantially flat or planar, as shown, or alternatively it may be curved or arcuate, e.g. so as to be locally flat/planar at any given point thereon.

The size (especially maximum transverse width and/or depth) of the facets 4 may also relate to the predetermined position of the light source whose light distribution is to be transformed into the predetermined output light distribution through the interactions with the faceted surface Fa (as described in more detail elsewhere herein). In some embodiments the size (especially maximum transverse width and/or depth) of the facets may be substantially (or considerably) smaller than—e.g. at least about 10 times or 20 times or 30 times or 40 times or 50 times or 80 times or 100 times smaller than—their distance from the light source, especially so many times smaller than their distance from the light source in the direction of the considered light distribution (e.g. perpendicular to the elongation axis of a linear light source), so that the incident (i.e. input) light of substantially one (especially one dominant) direction or small range of such directions covers a plurality of facets. As such a "small range of such directions" in this context may be considered a narrow angular width of the light source in relation to the distance from the faceted surface Fa (which may, for example, relate also to the achievable resolution of the output light distribution, which, in the lighting industry, may typically be no better than 5° and may be as large as about 25° or worse, in cases where highly diffuse optics are used).

Figure 23:
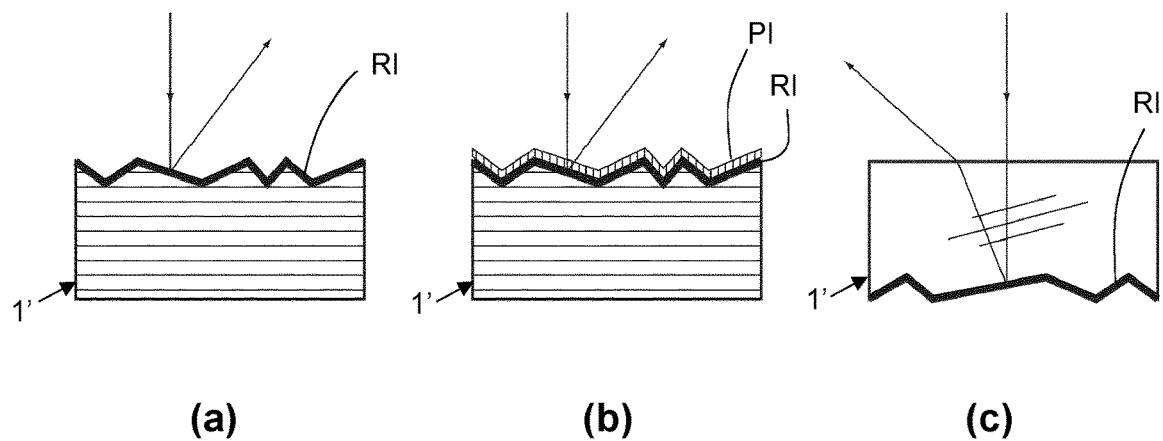
FIGS. 23(*a*), (*b*) & (*c*) are schematic sectional views of three further embodiments of optical element according to the invention which are of the reflective type, illustrating the faceted or non-faceted nature of their respective surfaces, in a similar manner to the transmission-type embodiments of FIGS. 6(*a*) & (*b*)

In some other embodiments of the invention, the optical element may instead be of the reflective type—three examples of which reflective-type embodiment optical elements 1' are shown in FIGS. 23(*a*), (*b*) & (*c*). In these alternative forms of optical elements 1', the surface RI of each optical element 1' responsible for its primary optical function is reflective to light in a desired wavelength range, e.g. typically visible light substantially across the whole of the visible region of the electromagnetic spectrum. In the embodiment shown in FIG. 23(*a*) the said reflective surface RI is illuminated directly, whereas in the embodiment shown in FIG. 23(*c*) the said reflective surface RI is illuminated indirectly through the body of the optical element 1'. In the embodiment shown in FIG. 23(*b*) the said reflective surface RI is illuminated through a transparent surface coating layer PI. Examples of materials for forming the said reflective surface RI (or even the whole reflective optical element body 1' in the embodiments of FIG. 23(*a*) or (*b*)) may include aluminium, silver, gold, chromium, as well as various other metals or metal alloys. In the embodiment shown in FIG. 23(*b*), the same reflective surface RI (and the same example materials therefor) may optionally be covered by a thin layer PI (or a plurality of thin layers PI) of at least one material which is transparent in the said wavelength range, such as silicon dioxide, which may serve to protect the reflective surface material RI, or may even form a dielectric reflective coating PI. In all three of these alternative embodiments shown in FIGS. 23(*a*), (*b*) & (*c*), where the said reflective surfaces RI are employed to provide the reflective function, the transparent/transmissive material of the main bodies of the optical elements 1' may again be such that it allows for easy manufacturing of the optical elements, such as PMMA (polymethylmethacrylate), PC (polycarbonate) or PET (polyethylene terephthalate). Various epoxies, UV lacquers or UV-curable polymers may optionally be used as well, if desired or appropriate.

As will be appreciated from the foregoing, in most practical embodiment optical elements in accordance with the invention, each of the primary facets in the faceted structure may have an optical function that serves to redirect light which is substantially only or predominantly a refraction (or a reflection) optical function, i.e. substantially without any, or any appreciable, diffraction optical function (in which context "diffraction" means a phenomenon that would be represented by several primary facets working in tandem in a way similar or corresponding to a diffraction grating).

Figure 6:
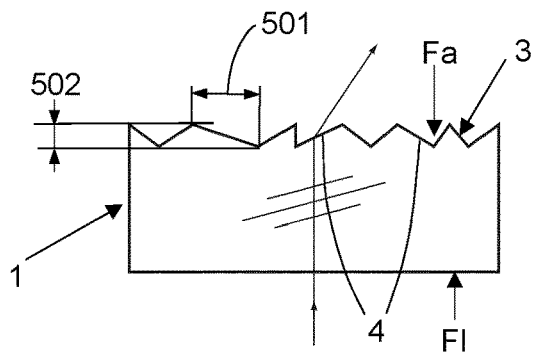
FIGS. 6(*a*) & (*b*) are schematic sectional views of two basic embodiment optical elements according to embodiments of the invention, illustrating the faceted or non-faceted nature of their respective surfaces.
Figure 6:
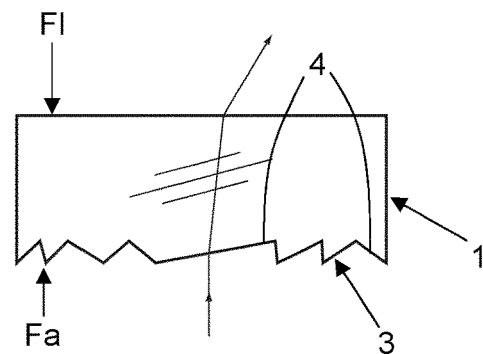

The novel arrangement of the faceted structure 3 will be explained in the following description primarily in the context of a transmission optical element with one faceted surface Fa, as shown for the embodiment of FIG. 6(*b*), but it is to be understood that it may be equally applicable to the one faceted surface Fa as shown for the embodiment of FIG. 6(*a*). It is yet further to be understood that it may be just as applicable to a reflection-type optical element with one faceted surface, which faceted surface may in such cases typically be a reflective surface of the optical element (e.g. as shown in FIG. 23(*a*)), although any reflective surface thereof could possibly be other than the faceted surface thereof.

Figure 7:
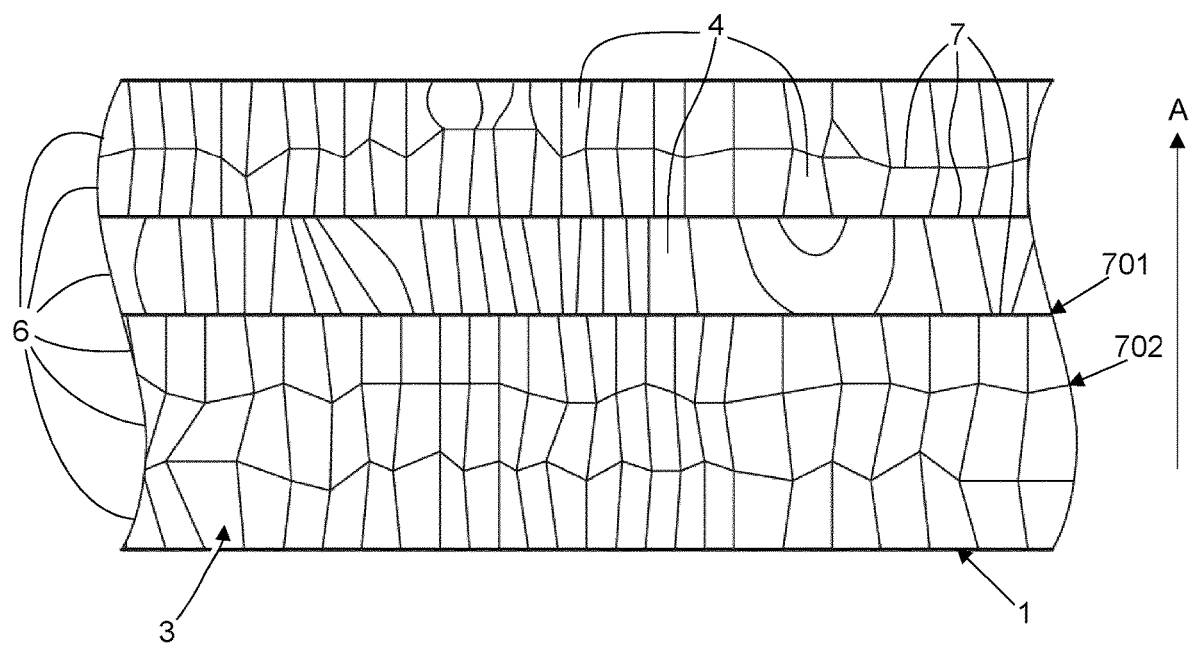
FIG. 7 is a plan view of the arrangement of strips or rows of primary facets on a surface of an example optical element according to one embodiment of the invention.

As shown in detail in FIG. 7, the faceted structure 3 is split into a plurality of strips 6, which is to say a plurality of generally linear rows or sequences or arrays 6 of facets 4 that may each be relatively narrow in the direction along the optical element (which direction is indicated by the arrow A) and each may span substantially the full transverse width (or a major proportion of the transverse width) of the optical element 1. (In this context the term "strip" is to be construed broadly as meaning any generally substantially linear row, sequence or array of individual facets, neighbouring ones of which are arranged generally side-by-side relative to one another passing along the strip, and which strip may be generally substantially straight or alternatively may be curved or arcuate or otherwise non-straight in two or even three dimensions.) In many practical embodiments the or each strip 6 may have its longitudinal axis arranged substantially perpendicular to the longitudinal axis of the optical element itself.

The or each strip 6 of facets 4 has a width (or maximum width) across the strip or row—i.e. across the strip/row transversely relative to its general length direction, i.e. a width (or maximum width) in the direction of arrow A—in the region of from a few (or several) hundred nanometers up to a few (or several) hundred micrometers, e.g. in an approximate range of from about 100 or 200 or 300 or 400 or 500 or 1000 or 5000 nm up to about 25 or 50 or 100 or 200 or 300 or 400 or 500 or 1000 μm.

The borders or boundaries 7 between the strips 6 may be visible, as shown as 701, or the strips 6 may be laid next to each other substantially without any visible border, as shown as 702, i.e. such that the facets 4 within each strip 6 continuously connect to, or are continuations of, facets 4 of an immediately adjacent strip 6, i.e. of a neighbouring strip 6 either immediately thereabove or therebelow. In other words, an invisible boundary (e.g. 702) between two adjacent strips 6 may be a boundary configured such that the respective neighbouring or adjacent edges of a first facet 4 within a first strip 6 and of a second facet 4 within a second strip 6, which strips 6 lie at a common boundary between the said strips 6, are matched in (i.e. are of substantially or approximately the same) size and/or position and/or shape, at least at, or in the vicinity of or in the respective portions of each facet 4 that are located adjacent, that common boundary.

Figure 8:
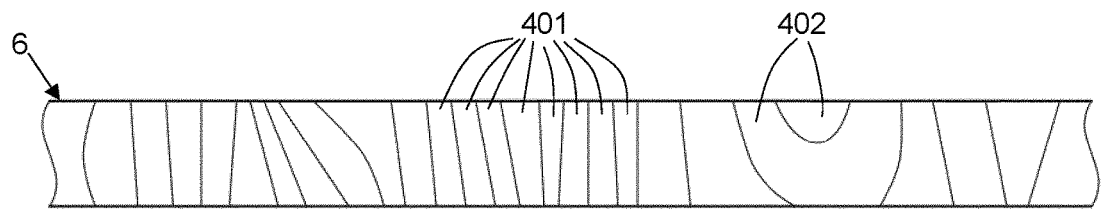
FIG. 8 is an enlarged plan view of certain ones of the primary facets that may be included in one of the faceted strips/rows of the embodiment optical element of FIG. 7.
Figure 9:
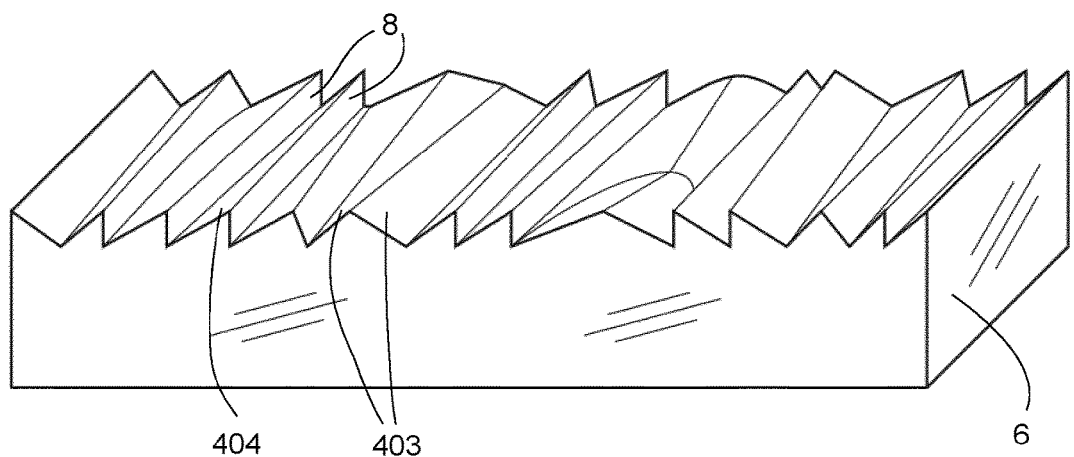
FIG. 9 is a perspective view of one example of another of the faceted strips/rows of the embodiment optical element of FIG. 7, showing its faceted structure.

As shown in FIGS. 8 and 9, each of which shows on an enlarged scale an example of various configurations of the facets 4 of one given strip 6 of the optical element shown in FIG. 7, the majority of (or most of, or perhaps even substantially all of) the facets 401 may span the full width of (i.e. width across) the strip 6 and may be laid next to each other, side by side, along the strip 6. However, some exceptions to this may be present or may be tolerated, in that some of the facets 4 (e.g. a minority of or a selected small number of or selected small distribution of the facets 4) may span only part of the width of (i.e. only part of the width across) the strip 6 and/or are optionally curved or twisted back on themselves (moving along the strip 6) towards one lateral edge of the strip 6—as illustrated by way of example by the facets 402 in FIG. 8. Alternatively or additionally, some of the facets 4 (e.g. a minority of or a selected small number of or selected small distribution of the facets 4), or possibly even all of them in certain other versions, may continuously transition from one to another to form a continuous faceted surface—as illustrated by way of example by the facets 403 in FIG. 9. Alternatively or additionally still, some of the facets 4 (e.g. a minority of or a selected small number of or selected small distribution of the facets 4), or possibly even all of them in certain other versions, may transition from one to another with a step, i.e. a discontinuity, in which case the boundary between any two such neighbouring facets of this type may be connected by an intermediate (e.g. vertical, as seen in FIG. 9) connecting (or transition) surface 8 (like steps in a staircase)—as illustrated by way of example by the facets 404 (and their vertical intermediate connecting surfaces 8) in FIG. 9.

In the Fresnel-like optics field the above-mentioned intermediate (e.g. vertical) surfaces 8 are sometimes called "secondary facets". However, for the purpose of the present disclosure of the invention they are better termed "connecting" or "transition" surfaces. Thus, in many embodiments of the present invention, such connecting or transition surfaces 8 may be a by-product of the optical element's overall design, i.e. these intermediate surfaces 8 may generally be designed not to perform any specific optical function, although they may contribute to the overall optical function of the optical element, but usually only as a by-product of the design of the faceted surface of the element.

In each of the FIGS. depicting embodiment optical elements or optical arrangements in accordance with various embodiments of the invention, each of the facets 4 may be definable as being a curved surface or face, especially one that is substantially smooth, and whose shape can be defined by, especially to a good approximation by, a quadric surface—i.e. a portion of any of an ellipsoid, an elliptic paraboloid, a hyperbolic paraboloid, an elliptic hyperboloid, an elliptic cone, an elliptic cylinder, a hyperbolic cylinder, or a parabolic cylinder. Alternatively, a simpler curved surface such as a (or a portion of a) cylindrical, conical, spherical or bilinear surface, or perhaps even a flat/planar surface, may define the curved surface of one or more of the facets 4. If desired or necessary, each facet 4 (or any one or more of them) may be further characterized by one or more additional geometrical properties thereof, e.g. an average angle of tilt.

Figure 10:
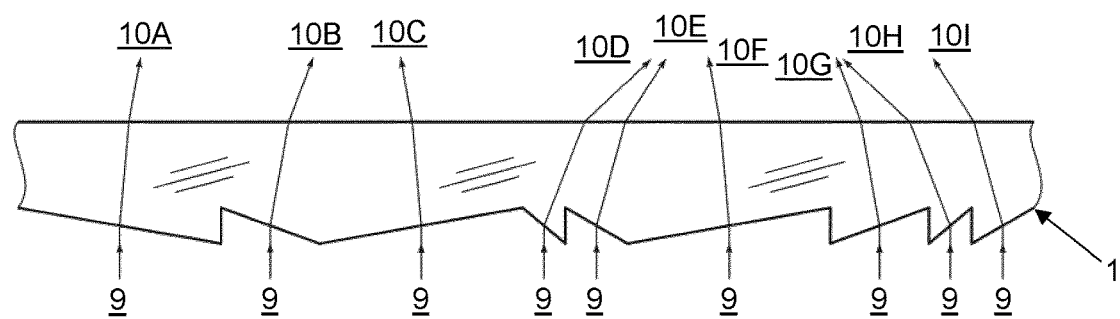
FIG. 10 is a schematic sectional illustration explaining how rays of light passing through one strip/row of the embodiment optical element of FIG. 7 are redistributed and redirected into the various output directions that are characteristic of that embodiment optical element.

As shown in FIG. 10, the geometrical properties of each facet are responsible for the manner in which the facet redirects light from a light source—that is to say, the manner in which light emitted by the light source in a respective dominant (as defined further below) input direction and reaching that facet from that particular dominant input direction 9 is redirected by that facet into a particular dominant (as defined further below) output direction 10, which may be any one of a plurality of different such (dominant) output directions 10A, 10B, 10C, 10D, 10E, 10F, 10G, 10H, 10I associated with the various primary facets in the faceted structure. Each facet may be configured in such a way that the light propagating therefrom at a given (dominant) output direction 10A/10B/10C/10D/10E/10F/10G/10H/10I dictated by that facet contributes to forming the overall desired or prescribed output light distribution pattern of the complete optical element 1. Moreover, for any given strip 6 in the optical element 1, substantially all the facets 4 contained within that given strip 6 may collectively form a part of the complete desired or prescribed output light distribution pattern (or its approximation) attributable to that strip 6.

As FIG. 10 illustrates, an optical element 1 according to various embodiments of the present invention may generally be characterized by the fact that any facet 4 within a given strip 6 redirects incident light from a respective input direction 9 (or, rather, respective dominant input direction 9) associated with that facet 4 into a respective output direction 10A/10B/10C/10D/10E/10F/10G/10H/10I (or, rather, respective dominant output direction 10A/10B/10C/10D/10E/10F/10G/10H/10I) associated with that facet 4, which latter (output) direction for any given facet 4 may even for example be independent of the corresponding output directions associated with its adjacent or neighboring facets 4 (or even other ones of the facets). This principle is also illustrated by FIG. 10. Moreover, the facets 4 distributed along the given strip 6 may each redirect incident light from a respective input direction 9 (or, rather, respective dominant input direction 9) associated therewith such that the redirected light propagating therefrom contributes to the overall desired or prescribed output light distribution pattern (represented by the various output directions 10A, 10B, 100, 10D, 10E, 10F, 10G, 10H, 10I collectively). Furthermore still, the facets 4 in a given strip 6 may each redirect incident light from a respective input direction 9 (or, rather, respective dominant input direction 9) associated therewith such that: the distribution of the respective output directions 10A, 10B, 100, 10D, 10E, 10F, 10G, 10H, 10I has a random or quasi-random character or property with respect to the positions of the respective facets 4 in the given strip 6, and the random or quasi-random character or property of that distribution may be defined by a probability density function correlating with the overall desired or prescribed output light distribution pattern and not with the positions of the respective facets 4 in the given strip 6. These principles are further illustrated by FIG. 10.

The above-mentioned random (or quasi-random) character of the distribution of the respective output directions 10A, 10B, 100, 10D, 10E, 10F, 10G, 10H, 10I may alternatively be manifested in the fact that any given area of the optical element 1 mounted in a luminaire may itself create a substantial part of the overall desired or prescribed output light distribution pattern, comprising output directions 10A, 10B, 100, 10D, 10E, 10F, 10G, 10H, 10I randomly distributed across all of the output directions within the output light distribution pattern, where the said area is significantly larger than an average area of an individual facet 4 within that area of the optical element 1.

Referring now to FIGS. 11 to 22, having now described some of the more general principles and features of many embodiment optical elements according to the invention, there now follows a more detailed description of various features and embodiments of the invention and how they may be realized in practice.

Since the optical elements according to this invention are primarily intended for use in luminaires, the overall optical behaviour (i.e. optical function) of such optical elements may be described as an ability to transform an incident light distribution (which is to say, incident light generated by a light source, such as a linear array of LEDs) at the input side of the optical element into a desirable or predetermined light distribution pattern at the output side of the optical element.

The Facets and Their Configuration

Figure 11:
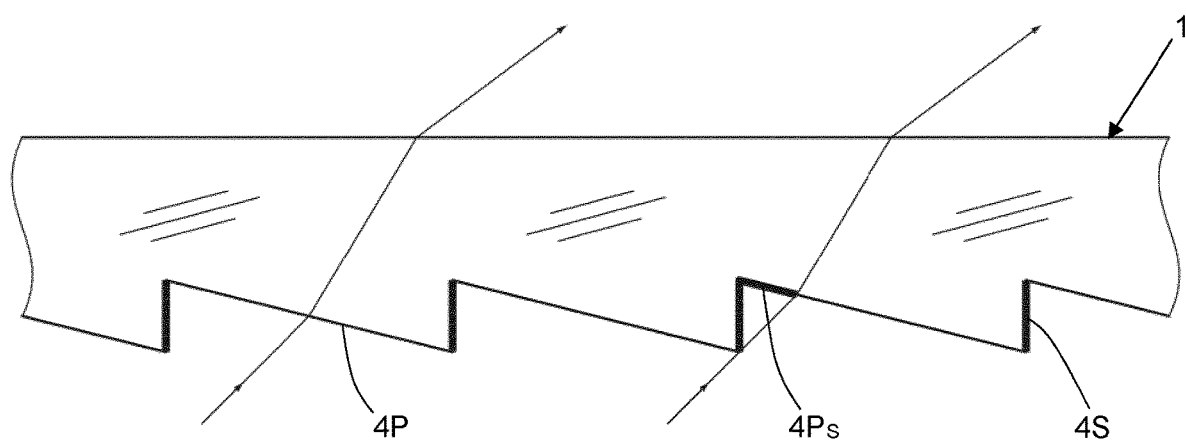
FIG. 11 is an enlarged sectional view of the configuration of representative primary and secondary facets of the embodiment optical element of FIG. 10.
Figure 24:
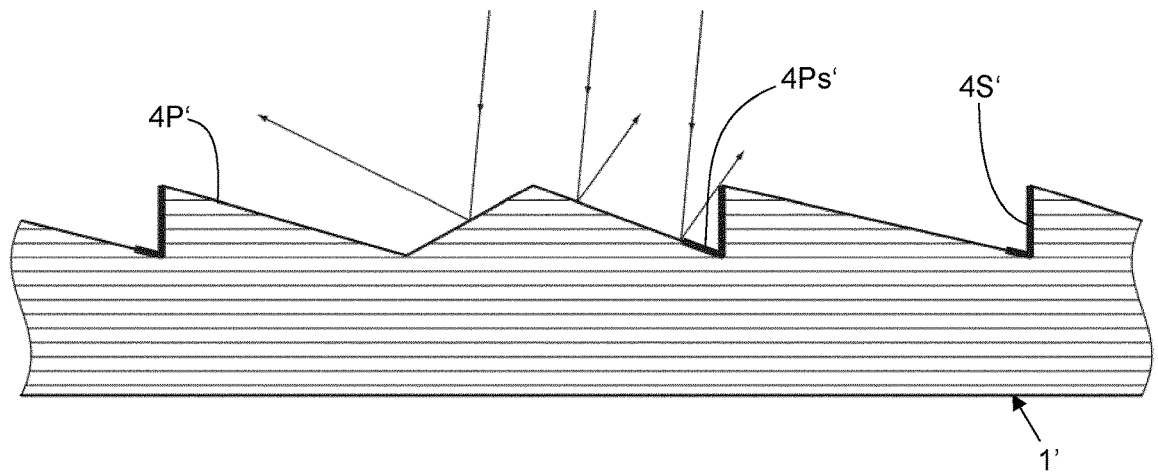
FIG. 24 corresponds to FIG. 11 and is an enlarged sectional view of the configuration of representative primary and secondary facets of the reflective-type embodiment optical element of FIG. 23(*a*)

As shown in FIG. 11, in embodiments of the present invention the optical element 1 may comprise two types or groups of facets, namely "primary" 4P and "secondary" 4S facets. These two facet types/groups 4P, 4S that are present in virtually all Fresnel-like optical elements were informally introduced earlier hereinabove, but here their configuration and construction are described in more detail and more technically. The first group of facets 4P, or their major parts, may be considered as "primary", i.e. incident light from the light source is refracted by each primary facet 4P, is directly propagated through the optical element 1 from its input side or facial surface to the other, opposite, output side or facial surface, and from there immediately exits the element 1 so as to contribute to the overall desirable or predetermined output light distribution. The second group of facets 4S, optionally together with some minor portions 4Ps (e.g. edgemost or peripheral portions or rounded corner portions) of facets 4P from the first group, may be considered as "secondary", and are for example constituted by those facets or portions of facets that are not directly visible from the location of the light source (i.e. they are not in the line of light rays emanating directly from the light source, or light rays emanating directly from the light source do not impinge thereon or are not directly incident thereupon), or by facets which are artifacts of transition(s) between two adjacent primary facets 4P. Such secondary facets 4S (or 4Ps) may usually be designed specifically not to have an optical function, and so may not normally contribute to the overall optical function of the optical element by virtue of its primary design features, which may be focused mainly on the primary facets 4P. (In alternative embodiments where the optical element is of the reflection type, as shown in FIG. 24, the primary facets 4P' are again those that redirect light from the light source in the simplest possible way, i.e. without intentional interaction with other facets, as shown in that FIG. 24.)

The interaction of light with the secondary facets 4S (or 4Ps) may be more complex, and the light after such interactions may not contribute effectively to the overall output light distribution. In embodiments of the present invention, the primary facets 4P may be considered to be the major contributor to the overall optical function of the optical element, whereas the optical function of the secondary facets 4S may be generally considered as optical noise-generating. Although such noise may be primarily undesirable in the optical behaviour of the optical element, it may nevertheless have a secondary (i.e. inadvertent) optical function which is to help to "smooth out" or homogenize or diffuse the overall output light distribution generated by the optical element. The process of designing an optical element in accordance with embodiments of that aspect of the present invention may thus generally be focused on covering substantially the entire area of the optical element's surface(s) or major face(s) with primary facets, whilst minimizing the number of secondary facets or choosing their location such that the interaction of light with them is minimized.

For the purposes of simplicity and clarity, in the present disclosure the facets may be considered to be smooth, with there being clearly defined, or even "sharp", transitions between facets. However, in practice in real-life embodiments, at least some facets may be somewhat deformed or distorted owing to manufacturing characteristics and constraints, e.g. facet surfaces may be somewhat rough or their edges or corners may be somewhat rounded, etc. These artifacts, as already mentioned above, may typically cause some optical noise in the output light distribution present, which may appear on top of a primary desired light distribution pattern.

Nevertheless, in certain embodiments of the invention, the facets may be intentionally made fully or partially rough or otherwise distorted, in order to employ light scattering as an aid to smoothing out (i.e. homogenizing or making partially diffuse) the overall output light distribution pattern, or to blur colour artifacts in the output light distribution which may be caused by a colour-over-source variation or by a spectral dispersion in the material or by diffraction. Such purposive distortions of facet surfaces will be further described later hereinbelow.

Constructing the Facets

The following description explains how the facets may be designed and constructed. It assumes the use of a specified light source, for example a linear strip of LEDs, and an optical element to become an optical element according to an embodiment of the invention, the element being located at a particular position or location relative to the light source, and the first, input surface (or face) of the optical element facing the light source and the second, output surface (or face) of the element facing in the opposite direction.

The optical element may have an overall configuration such that it can connect with or be mounted in a body or frame or housing of a luminaire further comprising the light source, such that the predetermined location of the light source relative to the optical element is ensured, especially automatically ensured for that optical element. For this purpose the optical element and/or the luminaire body, frame or housing may, for example, comprise one or more engagement or interengagement means (or attachment or connection features) to enable its attachment or connection to the luminaire body, frame or housing. For instance, the optical element may be configured such that it is receivable by a sliding motion into one or more, e.g. a pair of, grooves or channels formed in the luminaire body, frame or housing. Various other suitable engagement or interengagement means (or attachment or connection features) may alternatively be used instead.

In some embodiments of the invention, the optical element may be designed such that the first surface is to be faceted and the second surface is to be flat. In other embodiments, the optical element may be designed such that the first surface is to be flat and the second surface is to be faceted.

Figure 12:
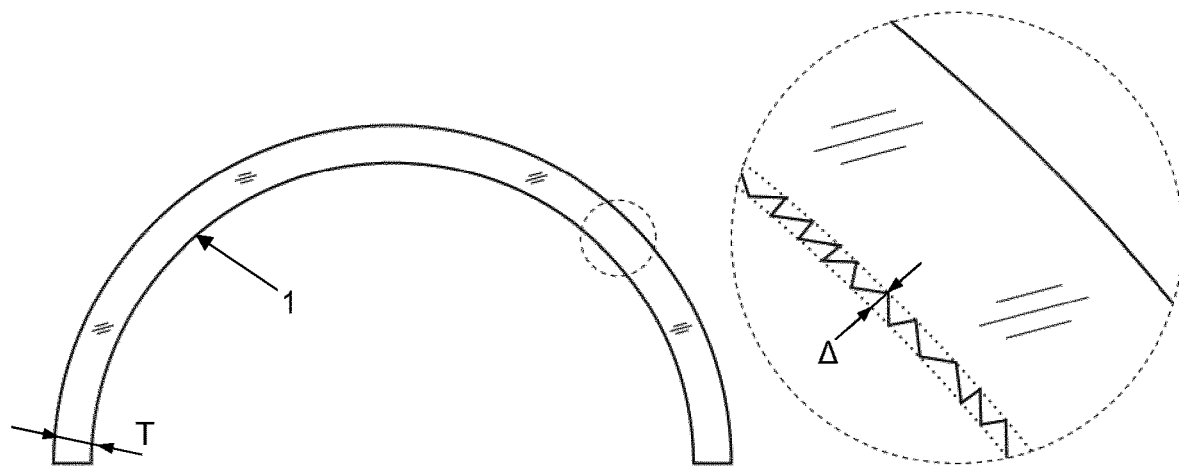
FIG. 12 is a simplified sectional view of an alternative, curved embodiment optical element according to the invention, showing the key dimensions of the element's principal components.

The optical element 1 may take the form of a generally substantially flat (i.e. generally substantially planar) or—as shown in FIG. 12—curved (e.g. arcuate or otherwise non-flat in two or three dimensions) plate or sheet, with a nominal thickness T. The nominal thickness T may be as small as several tens of micrometers or as thick as several tens of millimeters—e.g. in an overall thickness range of from about 10 or 20 or 30 or 40 or 50 or 60 or 70 or 80 or 90 or 100 µm up to about 1 or 5 or 10 or 20 or 30 or 40 or 50 or 60 or 70 or 80 or 90 or 100 mm. The nominal thickness T may be substantially the same over substantially the whole area of the optical element 1, as shown in FIG. 12. The facets forming a faceted relief structure may descend a small distance below the ideal non-faceted surface. The maximum depth (or height) Δ of the faceted relief may be in the range of from a few or a few tens of nanometers (or even from near-zero) up to several tens or a few hundreds of micrometers—e.g. in an overall depth/height distance range of from about 0 or 0.5 or 1 or 2 or 3 or 5 or 10 or 20 or 30 or 40 or 50 or 60 or 70 or 80 or 90 or 100 or 150 or 200 or 300 or 400 or 500 nm up to about 2 or 5 or 10 or 20 or 30 or 40 or 50 or 60 or 70 or 80 or 90 or 100, or even up to about 200 or 300 or 400 or 500 µm.

It is also to be assumed that the location of any point on the faceted (in this case first) surface can be described by a triplet (u, v, −d), where 0<d<Δ is the actual surface depth below the "ideal", i.e. non-faceted, surface, and the pair (u, v) uniquely describes the position of the point on the ideal non-faceted (i.e. infinitesimally thin, when thought of as a mere surface) optical element. Thus, a triplet (u, v, −T), where T is the nominal thickness of the optical element, uniquely describes a point on its flat, in this case second, surface. This coordinate system assumes that the coordinate u runs across the optical element (i.e. transversely or from side-to-side) and the coordinate v runs along the optical element (i.e. longitudinally or along its length). (It is further to be understood that that longitudinal or length direction of the optical element may correspond to the general longitudinal direction or orientation of a linear light source (e.g. a strip or row of LEDs) which may constitute the light source with which the optical element is intended to be used.)

Figure 13:
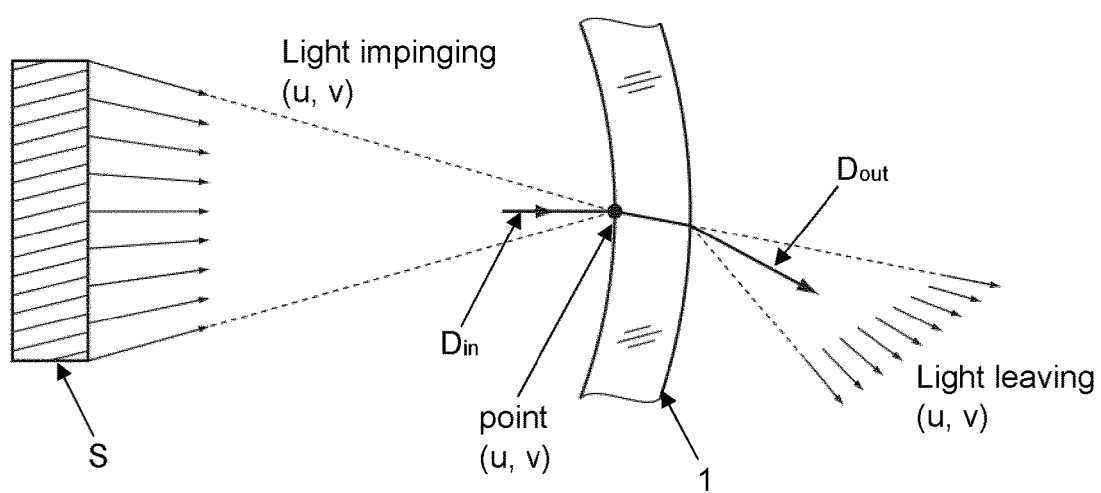
FIG. 13 is a schematic illustration explaining the nature of and relationship between the dominant input direction and dominant output direction of light entering and exiting the embodiment optical element of FIG. 7.
Figure 14:
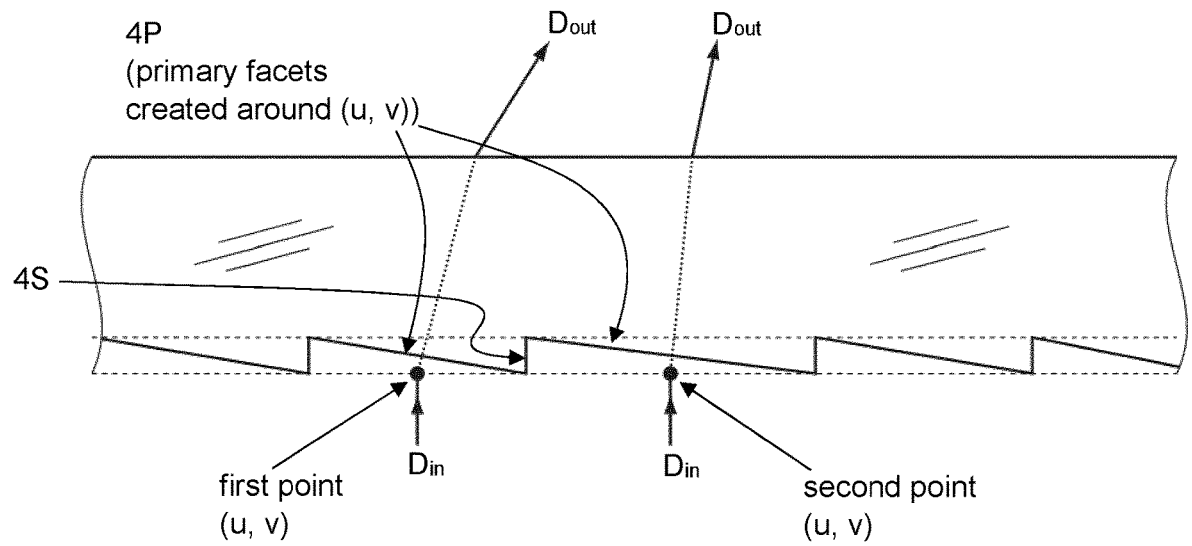
FIG. 14 is a schematic illustration explaining how the various primary facets of the embodiment optical element of FIG. 7 are formed.
Figure 25:
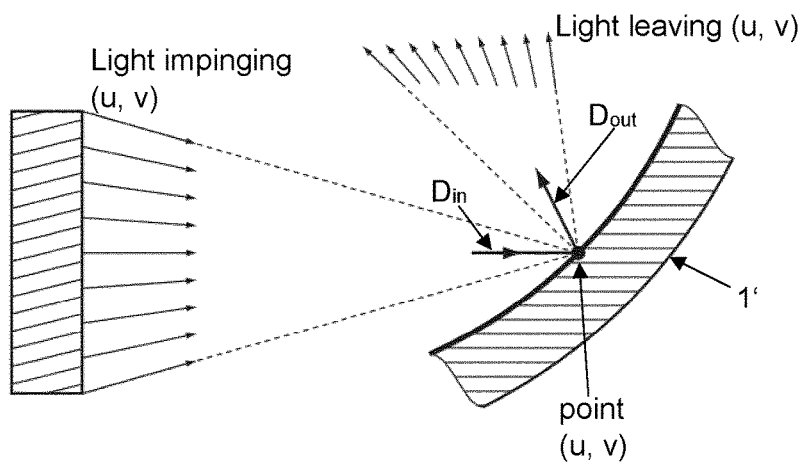
FIG. 25 corresponds to FIG. 13 and is a schematic illustration explaining the nature of and relationship between the dominant input direction and dominant output direction of light entering and exiting the reflective-type embodiment optical element of FIG. 23(*a*)

As shown in FIG. 13 (and also in FIG. 25), light incident at a point (u, v) on the optical element may in some cases be complex (i.e. coming from more than one direction), but it is possible to define its dominant input direction $D_{in}$, e.g. an average direction, a weighted average direction, a direction of maximum intensity, a direction coming from the closest point on the elongation axis of the linear light source, or possibly in another way. This is illustrated by FIG. 13 for optical element embodiments working in the transmission regime, and by FIG. 25 for optical element embodiments working in the reflection regime. Light leaving a point (u, v) may be complex (based on the complexity of the incident light or based on the distortion of the facet), but it is possible to define its dominant output direction $D_{out}$ as a refracted (or reflected) dominant input direction $D_{in}$. The dominant input direction $D_{in}$ at a point (u, v) is derived from the light source and the position and orientation of the optical element relative to the light source. The dominant output direction $D_{out}$ is one of the directions in the desired output light distribution pattern. The dominant input and output directions $D_{in}$, $D_{out}$ are used to construct, i.e. to design, the facets.

Figure 26:
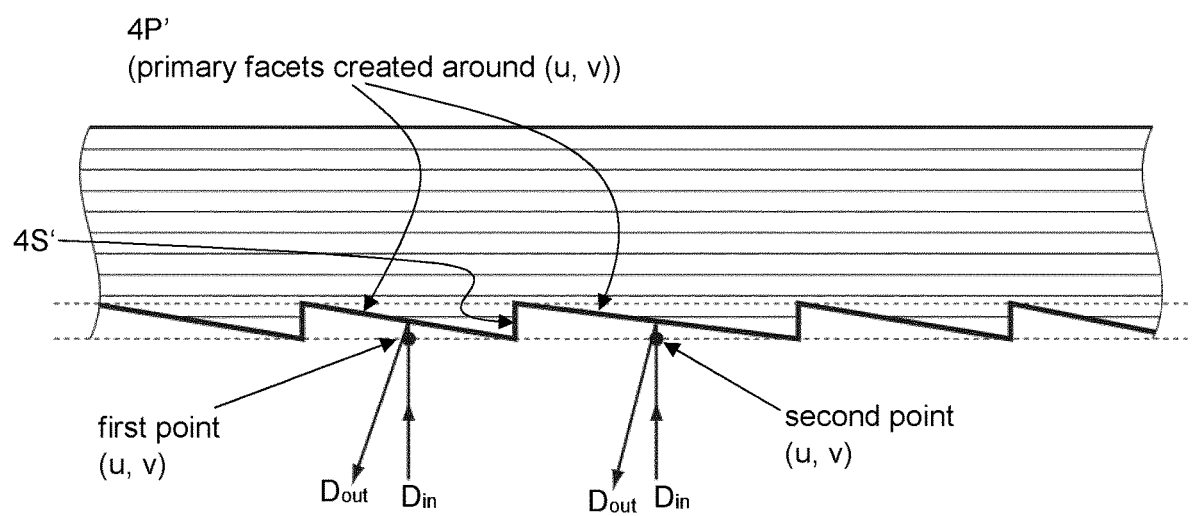
FIG. 26 corresponds to FIG. 14 and is a schematic illustration explaining how the various primary facets of the reflective-type embodiment optical element of FIG. 23(a) are formed.

A facet at location (u, v) on the optical element can be locally described by various means, e.g. by its tilt along coordinate u and its tilt along coordinate v, its curvature and tilt, etc. Furthermore, light leaving the whole optical element must approximate to the desired prescribed light distribution as closely as possible. On this basis it is generally possible to create, i.e. design, the facets as follows—see FIG. 14 for optical element embodiments working in the transmission regime and FIG. 26 for optical element embodiments working in the reflection regime:

Choose a point (u, v) on the optical element and determine the dominant input direction. Choose a dominant output direction and determine the properties of the facet at (u, v) in such a way (e.g. using a known tracing approach or known diffraction grating approach) that it changes the dominant input direction to the dominant output direction. Determine an area around (u, v) and create the primary facet in that area according the previously determined facet properties at (u, v). That area shall be determined in such a way that the maximum faceted surface depth below the ideal non-faceted surface does not exceed the maximum relief depth Δ, and/or that the facet dimensions are limited according to a design decision, or possibly in another way.

One such "another way" that is especially worth mentioning is that in a case where the area is determined according to a particular design decision in which at least one or more of the primary facets are to be Fresnellated, as a result of which the depth of the resulting Fresnellated sub-facets is significantly less than the depth of the respective primary facet they are designed to replace. In such a case, the area to be determined is for example small enough to be invisible by the naked eye. According to such a case, where a primary facet in that area would normally exceed the maximum relief depth Δ, it is possible to break it into a plurality of smaller Fresnel-like sub-facets, so that the said plurality of Fresnellated sub-facets do not exceed the maximum relief depth Δ. In another words, the said plurality of Fresnellated sub-facets share substantially the same dominant output direction. It should be emphasised here, therefore, that the principle of "randomness" of the dominant output directions associated with the positions of the primary facets (at the macro level) is indeed locally violated inside those primary facets which are Fresnellated in this manner. Thus, at the macro level, the idea of randomness of the dominant output directions or the independency of the dominant output directions of adjacent primary facets, which underpin many embodiments of the present invention, shall be construed with this aspect in mind, i.e. when any primary facets are Fresnellated in this manner in certain embodiments of the invention. This is also the reason why it is sometimes more appropriate to use the term "quasi-random" rather than "random" per se. Such "quasi-randomness" thus allows us in certain embodiments of the invention to introduce substantially irrelevant regularities (in the context of light redistribution), such as preferences of certain dominant output directions in specific parts of the optical element (e.g. as used in Example Embodiment 1 hereinbelow), or preferences of specific alternation of dominant output directions (e.g. as used in Example Embodiment 1 hereinbelow), or the use of Fresnel-like pluralities of sub-facets (as described in this paragraph and e.g. as used in Example Embodiment 2 hereinbelow).

Next, continue with the construction of the primary facets until they cover substantially the whole selected area of the surface of the optical element. Finally, fill the remaining area and/or transitions between the primary facets with the secondary facets.

Figure 15:
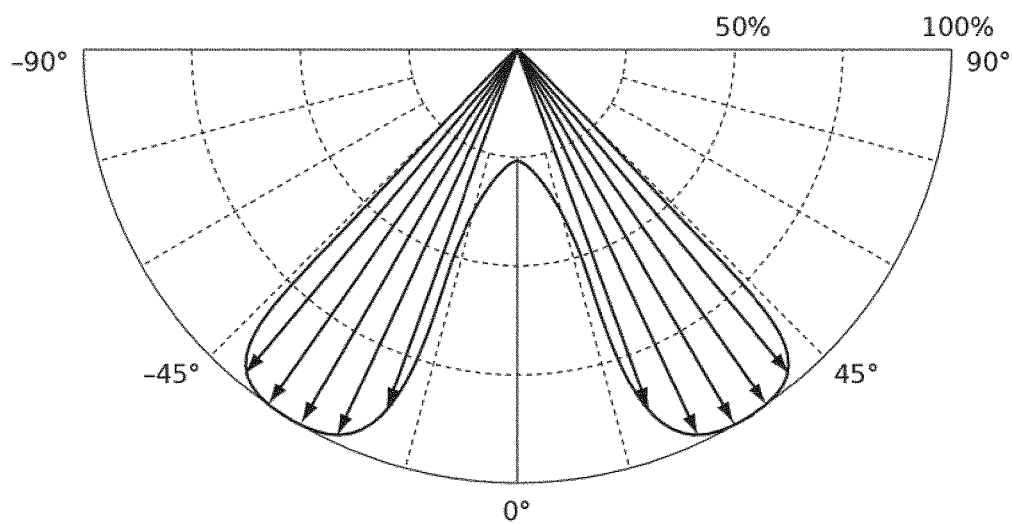
FIG. 15 shows the configurations of the prescribed output directions and prescribed light distribution of an example embodiment optical element such as that of FIG. 7.
Figure 16:
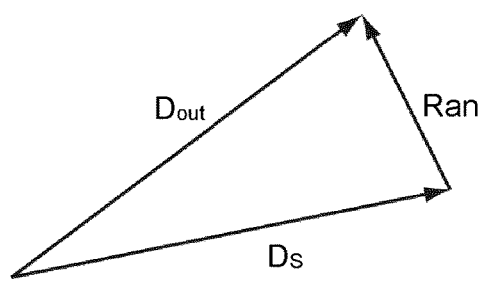
FIG. 16 shows the configurations of the prescribed, random and dominant output directions of the light distribution associated with FIG. 15.
Figure 17:
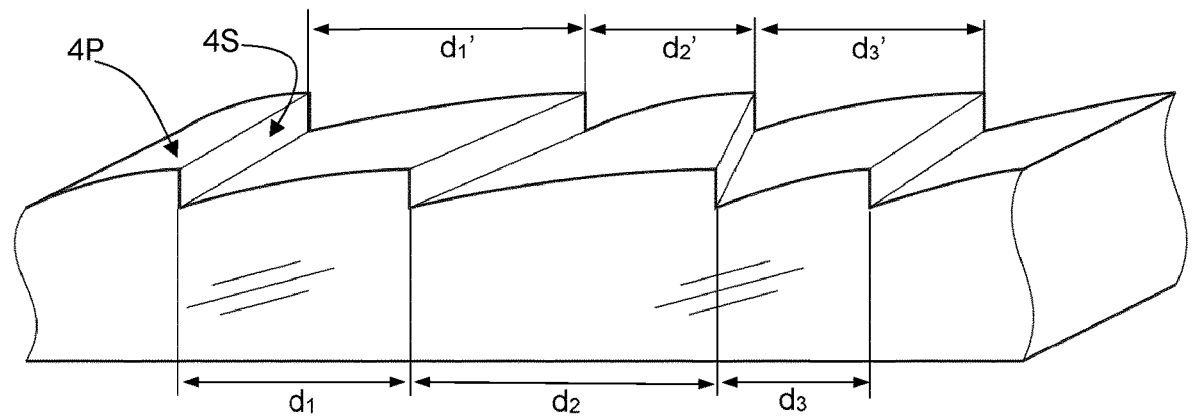
FIG. 17 is an explanatory perspective view of a left-hand portion of the embodiment optical element of FIG. 7, showing the configuration of the primary facets in a given strip/row in that portion of the element.
Figure 18:
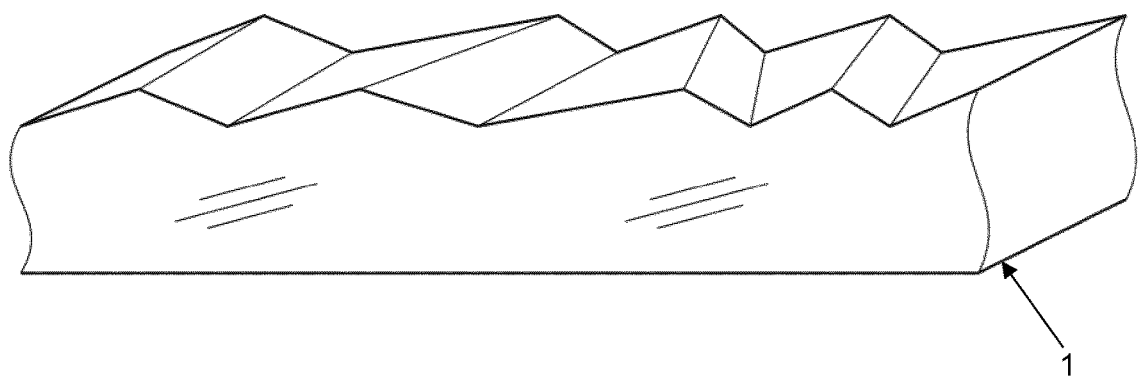
FIG. 18 is an explanatory perspective view of a central portion of the embodiment optical element of FIG. 7, showing the configuration of the primary facets in a given strip/row in that portion of the element.

A key decision in the process is the determination of the dominant output direction. It may be possible to do this with the help of traditional methods based on properties of conventional macroscopic optical elements, although in the practising of embodiments of the present invention a method based on statistical properties of the optical element being produced may be used instead. There are at least two ways of doing this, either of which may be used in the practising of embodiments of the invention, as follows (with reference to FIGS. 15 and 16):

(1) It is possible to approximate the prescribed light distribution by the set of prescribed directions $\{D_1, D_2, D_3, \ldots, D_{N-1}, D_N\}$, and their prescribed weights $\{w_1, w_2, w_3, \ldots, w_{N-1}, w_N\}$ (e.g. relative intensities), where N is not a small number (i.e. small statistically), especially where N is an integer of at least about 5 or 10—see FIG. 15. The dominant output direction at a given point (u, v) is provisionally chosen from the prescribed directions either randomly or in a deterministic way. The selected prescribed direction $D_S$ is then randomly altered by an additive factor Ran, whereupon $D_S$+Ran shall be used as the dominant output direction—see FIG. 16. Ran is a random direction factor which fulfills the condition <$D_S$+Ran>=$D_S$. Here, <*> means the average value over a large ensemble.

(2) Alternatively, the dominant output direction is selected randomly in such a way that the prescribed probability density function (i.e. determining probability of selection of a particular direction) correlates with the prescribed light distribution (i.e. distribution of intensities in the output light pattern). The dominant output direction is then randomly altered by a random direction factor Ran, for which <Ran>=Ø, where Ø means "no change in direction". Here, <*> means the average value over a large ensemble.

The presence of the random direction factor Ran may be a significant feature in the practical implementation of some embodiments of the invention. First of all, it may help to blur the distribution of light at the output of the optical element, i.e. to make it more diffuse or "soft", which is often required in the lighting industry and helps to suppress various glare-related effects (e.g. flares in the light distribution, UGR (unified glare rating) factor), and homogenize the brightness of the luminaire's emitting surface. Secondly, the arrangement of facets of the size discussed above may form locally periodic or quasiperiodic structures that may result in chromatic aberration caused by light diffraction. The presence of the random direction factor Ran may help to break the periodicity and thus to suppress visibility of any such chromatic aberration.

Clearly, the prescribed directions $\{D_1, D_2, D_3, \ldots, D_{N-1}, D_N\}$, the prescribed weights $\{w_1, w_2, w_3, \ldots, w_{N-1}, w_N\}$, and the prescribed probability density function in the relationships described above may in a way be similar to the prescribed light distribution. The degree of similarity may be affected by various optical phenomena such as light losses due to reflections, presence of the secondary facets, light diffraction, etc. It may thus be desirable in practice to use more comprehensive optical modelling beyond standard ray-tracing to capture these phenomena and include them into the design of the facets. However, it may be more feasible to produce an optical element according to a more basic design approach and then, after evaluating the real sample, to make empirical corrections to the model as necessary, i.e. to adjust the prescribed directions, the prescribed weights, the prescribed probability density function or properties of the random direction factor Ran, in order to achieve a better match of the measured light distribution with the prescribed light distribution. Thus, initially manufacturing the element and measuring its optical properties, followed by adjustment of the above parameters in order to compensate for any such differences, may be a more desirable overall approach.

The following specifically described embodiments illustrate two example ways of how the above design process may be applied in practice to an optical element in accordance with the invention, which descriptions are to be taken with reference to FIGS. 17 to 22:

Example Embodiment 1: Planar Rectangular Optical Element Providing Double-Asymmetric Luminous Intensity Distribution for a Linear Light Source The light distribution from FIG. 15 can be approximated by ten prescribed directions, e.g. +40°, +35°, +30°, +25°, +20° and −20°, −25°, −30°, −35°, −40° in the C0-180 plane, and equal prescribed weights.

Pick a point ($u_{MIN}$, 0) at the left-hand edge of the optical element. Set the dominant input direction as the shortest vector from the infinitely long light source to the selected point. Intentionally decide that in the leftmost portion of the optical element the prescribed direction is selected from directions corresponding to angles from +20° to +40°. Instead of using exactly this direction, use a randomized direction as the dominant output direction. An optical element that changes the dominant input direction to the dominant output direction may for example be a tilted cylindrical lens. The facet at ($u_{MIN}$, 0) is thus characterized by the curvature and the tilt of the respective cylindrical lens at the respective point. Create the facet that is very short in the v direction, say $v_F$, that corresponds to the surface of the respective cylindrical lens. The width of the facet in the u direction shall be set in such a way that the facet depth equals at most the maximum faceted surface depth Δ, for example exactly Δ. Continue with point ($u_{MIN}$+$u_F$, 0), where $u_F$ is the facet width at v=0. In this manner, a cross-section of the faceted surface at v=0 starts to resemble a sawtooth profile with a certain period, whilst a cross-section of the faceted surface at v=$v_F$ starts to resemble a sawtooth profile with a slightly different period—see FIG. 17. Note that the primary facets are stacked next to each other and the secondary facets are thus created between them. (Note also that in FIG. 17 the optical element is flipped upside-down in order to be able to see the facets on the first surface. Note that $d_1$, $d_2$ and $d_3$ are substantially random and that they slightly differ from $d_1'$, $d_2'$ and $d_3'$.)

In the central portion of the optical element it is intentionally decided that the prescribed direction is selected from directions corresponding to angles from +20° to +40° for odd facets and corresponding to angles from −40° to −20° for even facets. Note that in this manner the primary facets form a continuous surface, i.e. there is no need to make additional secondary facets—see FIG. 18. (Note again that in FIG. 18 the optical element is flipped upside-down in order to be able to see the facets on the first surface.)

The rightmost portion of the optical element is constructed in the same way as the leftmost portion, the only difference being the intentional decision to select the prescribed output directions from directions corresponding to angles from −40° to −20°.

Once the first row of the facets has been created, the procedure continues with a row of facets just above it in substantially the same way. The only difference is that care must be taken so that the facets in the adjacent rows form continuous surfaces. By repeating this process an appropriate number of times, successive rows or strips of facets can be created, each containing facets of the required shape and configuration for achieving the desired or predetermined overall output characteristics of the element. The final appearance of such an optical element is shown in FIG. 19, which illustrates the continuous nature (in a direction along the element) of the individual prism tips t of the facets in successive rows/strips.

If desired or appropriate, the final optical element may be evaluated. It may then be possible to alter—to any desired or appropriate degree that may be found to be necessary or desirable—any of the prescribed directions, randomness of the dominant output directions or the exact meaning of "the leftmost", "the central" and "the rightmost" portions of the optical element, in order to achieve an optimum match between the element's overall output and the desired or prescribed overall output light distribution.

Figure 19:
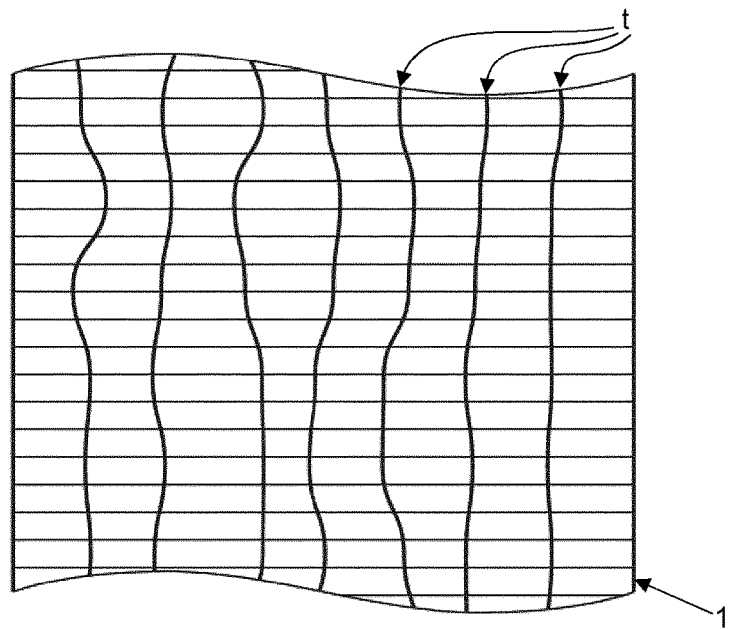
FIG. 19 is a plan view of another embodiment optical element according to another embodiment of the invention, showing the configuration of the overall primary facet prism tips in the combined strips/rows making up the faceted surface of the element.
Figure 20:
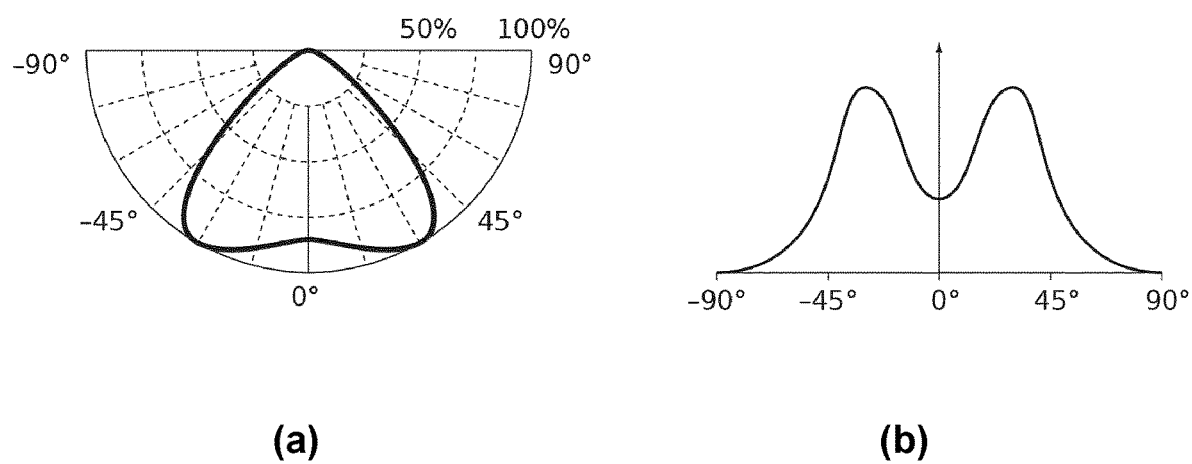
FIGS. 20(*a*) & (*b*) are graphical representations (respectively using the polar coordinate system and the Cartesian coordinate system) of the light distribution in the C0-180 plane which is used to construct the probability distribution density function as used to calculate and construct the various facets of the embodiment optical element according to Example Embodiment 2 hereinbelow.

As shown in FIG. 19, the faceted surface created in this embodiment may be formed by curved prisms running along the optical element with varying density. The cross-sections of the prisms across the optical element may therefore differ according to their position in the structure in a substantially deterministic way, i.e. they may resemble a sawtooth profile in the leftmost and the rightmost portions of the optical element, and they may resemble a triangular profile in the central portion of the optical element. On the other hand, the cross-section across an individual prism may be substantially random, i.e. the exact width and shape of the prism may not be able to be simply inferred.

Other embodiments providing different output light distributions may indeed be possible using the same principles and techniques as described above for this Example Embodiment 1, but the general idea and features may be substantially the same. For example:
  (i) The faceted surface created in this embodiment may be modified by being formed by curved prisms running along the optical element with varying density.
  (ii) The area of the faceted surface may be split into several substantially large regions, with each region being responsible either for a particular portion of the overall output light distribution or for substantially the whole of the output light distribution.
  (iii) The cross-section across an individual prism may be substantially random, i.e. the exact width and shape of the prism may not be simply inferred.

Example Embodiment 2: Planar Rectangular Optical Element Providing "Batwing" Luminous Intensity Distribution for a Linear Light Source The light distribution in the C0-180 plane as shown in FIG. 20(a) can be used to construct the probability density function so that the probability density function is non-negative, it has a similar, or correlating, shape to the light distribution in the C0-180 plane, and the area below the probability density function equals one, as shown in FIG. 20(b). Here, "similar" or "correlating" means that the probability density function and the light distribution share substantially the same count of local minima and maxima located at approximately the same angles, although exceptions are possible, especially in cases when local maxima or minima do not stand out too much. Note that the graph in FIG. 20(a) is drawn in the polar coordinate system, while the graph in FIG. 20(b) is drawn in the Cartesian coordinate system, as is commonly used in the art.

Figure 21:
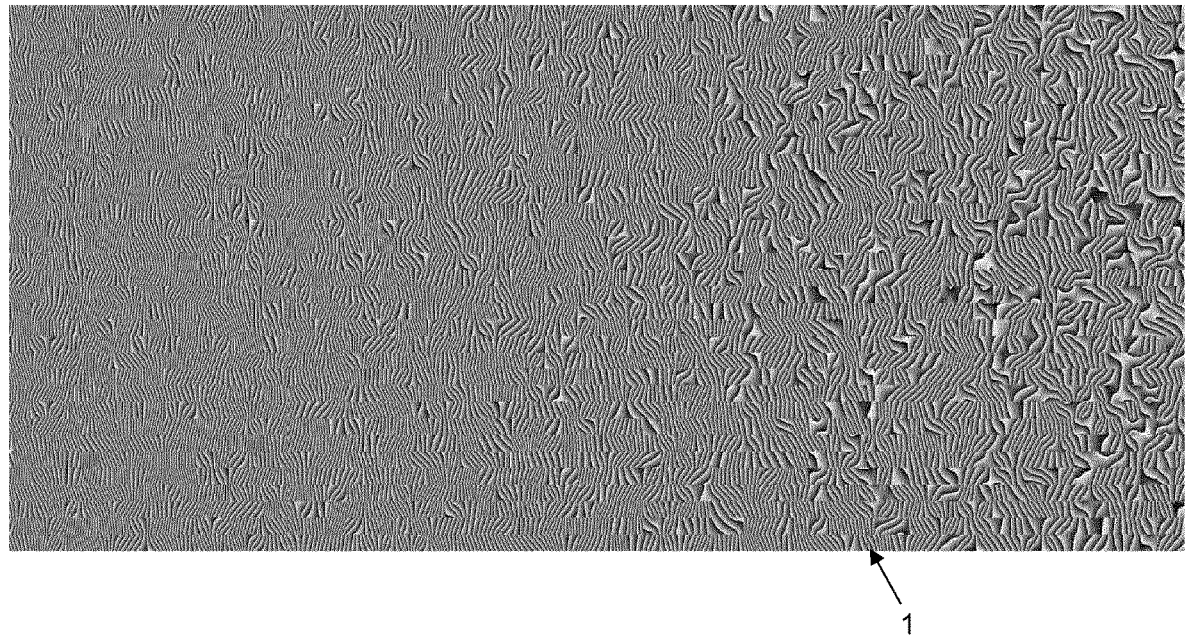
FIG. 21 is a face-on view of a portion of another example of a faceted optical element according to another embodiment of the invention, showing the arrangement of the primary facets in the form of a height map.
Figure 22:
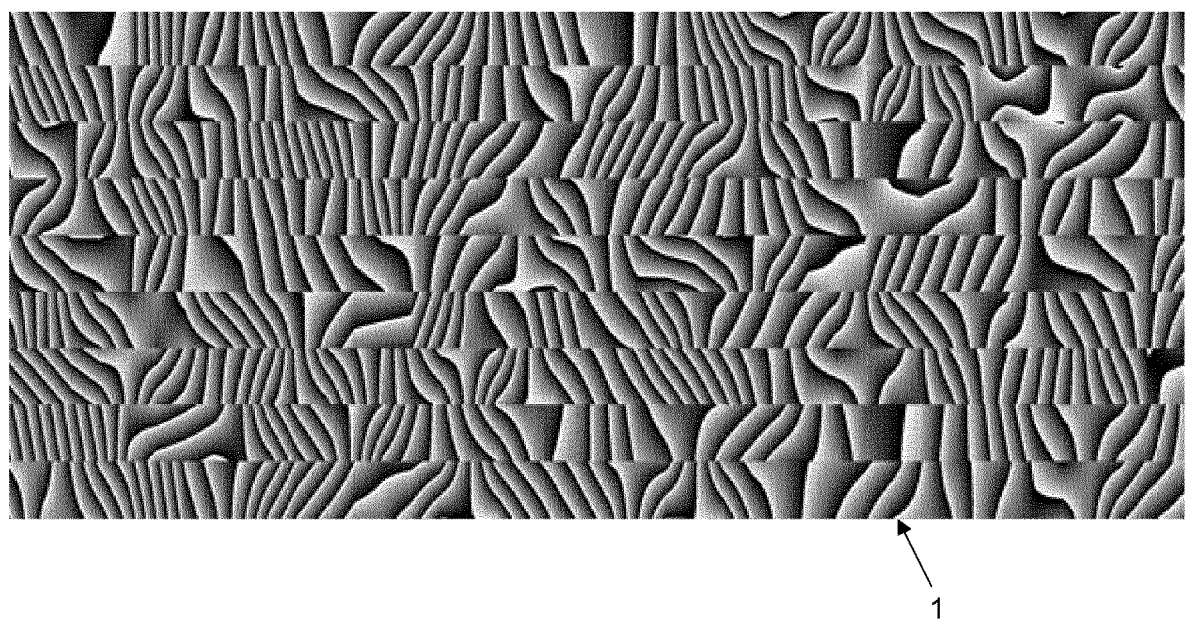
FIG. 22 is an enlarged close-up view of a portion of the arrangement shown in FIG. 21.

The facets can be constructed as follows:

Pick a point $(u_{MIN}, 0)$ at the left-hand edge of the optical element. Set the dominant input direction as the shortest vector from the infinitely long light source to the selected point. Pick a direction in the C0-180 plane according to the probability density function and add a random direction in the C90-270 plane to make the dominant output direction. An optical element that changes the dominant input direction to the dominant output direction may for example be a wedge $W_S$. Repeat the same procedure at a point $(u_{MIN}+s_U, 0)$, where $s_U$ is a suitable distance (depending on the designer's decision). The distance $s_U$ may be such that it leads to creation of one facet or a few facets between $u_{MIN}$ and $u_{MIN}+s_U$. At the point $(u_{MIN}+s_U, 0)$, for example, a wedge $W_E$ would change the dominant input direction to the dominant output direction. The rectangular area between $(u_{MIN}, 0)$ and $(u_{MIN}+s_U, s_V)$, where $s_V$ is a suitable distance that may be similar to $s_U$, can be filled with primary facets that resemble the wedge $W_S$ near $u_{MIN}$, the wedge $W_E$ near $u_{MIN}+s_U$ and an interpolated wedge between $u_{MIN}$ and $u_{MIN}+s_U$. If necessary, add corresponding secondary facets. Continue with point $(u_{MIN}+s_U, 0)$ and the corresponding rectangular area, bearing in mind that the dominant output direction has been already determined at $(u_{MIN}+s_U, 0)$. In this way, a strip of width $s_V$ is created across the optical element without visible seams or boundaries at multiples of $s_U$. Other strips are created in the same way. The result of applying this principle is illustrated in FIGS. 21 and 22, which show the resulting structure and appearance of a part of the optical element in the form of a height map (in enlarged detail in FIG. 22).

If desired or appropriate, the final optical element may again be evaluated. It may then be possible to alter—to any desired or appropriate degree that may be found to be necessary or desirable—the probability density function, or other parameters used in the method (e.g. $s_U$, $s_V$), in order to achieve an optimum match between the element's overall output and the desired or prescribed overall output light distribution.

The faceted surface created in this Example Embodiment 2 may thus be composed of strips running across (i.e. transversely relative to the longitudinal length of) the optical element. A cross-section across the optical element may resemble an irregular sawtooth profile, or a triangular profile, or a profile that mixes both sawtooth and triangular features. While it may be statistically inferred whether a specific portion of the cross-section is composed of prisms of certain properties, the exact properties of individual prisms may be substantially random and may not be able to be simply inferred. A cross-section along the optical element may also resemble an irregular sawtooth profile, or a triangular profile or a profile that mixes both sawtooth and triangular features. This time, there may be no statistical correspondence between the cross-section at a particular location in the optical element and the position of that location in the element.

Other embodiments providing different output light distributions may indeed be possible using the same principles and techniques as described above for this Example Embodiment 2.

In practising and bringing to reality practical embodiments of the present invention, for the purpose of carrying out and implementing in practice the above principles and methodologies, and for actually designing, defining and creating an optical element with its various specially designed and configured facets configured into the required faceted structures, any suitable computer software may be used to implement those methodologies and design and creation steps, in view of the above detailed descriptions of example embodiments thereof. Such software may in basic or generic terms already be in use in the optics industry for the creation of various known nano- or micro-structured optical elements for use in other applications or fields, and so will be readily available to the skilled person and within the purview of the person skilled in the present art of production of nano- or micro-structured optical elements. For example, a standard computing environment, such as standard programming languages, may be used (e.g. Python and Octave), together with standard toolkits (such as image processing tools). However, it may be expected that "standard" tools used in the lighting industry such as optical design tools (e.g. TracePro, Zemax, etc) may not be suitable for use in practising embodiments of this invention.

Furthermore, for the purpose of actually preparing and forming optical elements in accordance with embodiments of the present invention, standard methods, techniques and apparatuses may be used, as are already well known and widely used by persons skilled in the art. For example, a standard optical lithography system may be used for making a "master" optical element. Alternatively, e-beam lithography, ion-beam etching or other standard microfabrication technologies may be used instead. All these are well-known to the skilled person and widely available for commercial use.

Once the "master" has been created, then replication (i.e. mass-production) may be carried out, again in accordance with well-known methods and using well-known apparatuses, e.g. by use of stamping (such as hot stamping) or UV embossing or UV casting. Such processes may be quite similar to known technologies used for embossed hologram mass-production or production of micro-structures or micro-optics. Other practical techniques, methods and apparatuses may alternatively be used, as may be found to be most appropriate or desirable for a particular embodiment optical element product or ultimate embodiment luminaire application.

Going further, in practising some embodiments of the invention, if desired or necessary the optical element may be laminated, glued or attached onto another, secondary, optical component in the form of a secondary plate, sheet, layer, film, foil, substrate, or cover component, in order to form a unified composite optical element. Such a secondary optical component may or may not have an optical function of its own, and if it does, then that optical function of the secondary optical component may serve to impart any desired secondary or auxiliary optical function to the final output light distribution pattern achieved by use of the unified composite optical element, e.g. by introducing a diffusion function or one or more colour (e.g. colour-filtering) effects into the final light output pattern. Such laminating, gluing or attaching may be by virtue of any suitable known lamination, bonding, adhesion, affixation, fusion or other technique (e.g. using known lamination, bonding or attachment materials, methods and apparatuses and/or known conditions of elevated temperature and/or pressure, if necessary), or alternatively by virtue of a simple abutment technique (e.g. using suitable mechanical attachment or connection means if necessary). In such embodiments, the lamination, bonding or attachment of the optical element of the invention may be via its non-faceted surface/face. Once laminated/bonded/attached, the optical element of the invention and the secondary optical component may be either separable (or readily separable) or non-separable (or non-readily-separable) from one another.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

Furthermore, it is expressly envisaged in this disclosure of the present invention that the various aspects, embodiments, examples, features and alternatives, and in particular the individual constructional, configurational or operational features thereof, set out in the preceding paragraphs, in the claims and/or in the following description and accompanying drawings, may be taken independently or in any combination of any number of same. For example, individual features described in connection with one particular embodiment, or described singly or in combination with another feature in any one or more embodiments, are applicable on their own or in combination with one or more other features to all embodiments and may be found and used in combination with any other feature in any given embodiment, unless expressly stated otherwise or such features are incompatible.

The invention claimed is:

1. An optical arrangement for use in forming a luminaire, the optical arrangement comprising:
    an optical element; and
    at least one linear light source located at a predetermined location relative to the optical element;
    wherein the optical element is for creating a prescribed output light distribution pattern from light emitted by said light source at said predetermined location relative to the optical element, the optical element comprising a body including a surface which comprises a faceted structure, the faceted structure comprising one or more strips or rows each comprising a plurality of primary facets,
    wherein, for any given strip or row of primary facets:
    (i) each respective primary facet within the given strip or row is configured such that each respective primary facet redirects light from a respective input direction associated with that primary facet into a respective output direction associated with that primary facet;
    (ii) each respective primary facet within the given strip or row is configured such that light propagating therefrom in said respective output direction associated with that primary facet contributes to the prescribed output light distribution pattern; and
    (iii) the respective primary facets within the given strip or row are configured such that:
        the distribution of the respective output directions associated with the respective primary facets in the given strip or row has a random or quasi-random character with respect to positions of the respective primary facets in the given strip or row, and
        the random or quasi-random character of the distribution of the respective output directions associated with the respective primary facets in the given strip or row is defined by a probability density function correlating with the prescribed output light distribution pattern and not with the positions of the respective primary facets in the given strip or row.

2. The optical arrangement according to claim 1, wherein in the optical element the faceted structure comprises a plurality of strips or rows of said primary facets, wherein each strip or row comprises a plurality of said primary facets.

3. The optical arrangement according to claim 1, wherein the optical element comprises said body which is in the form of a plate or sheet of material having said surface which carries or has formed thereon or therein said faceted structure, and wherein the plate or sheet, or at least said surface thereof, is either:
(i) generally substantially flat or generally substantially planar; or
(ii) generally curved or arcuate in two or three dimensions; or
(iii) wedge-shaped or formed with one or more free-form shaped faces or surfaces.

4. The optical arrangement according to claim 3, wherein (i) or (ii) is satisfied, and the major faces of the plate or sheet are separated by a substantially constant or uniform distance.

5. The optical arrangement according to claim 1, wherein: either
(i) a material of which the body of the optical element is formed is substantially transparent to light with wavelengths in the visible region of the spectrum, whereby the optical element is a transmission-type optical element; or
(ii) the optical element is a reflective-type optical element, the optical element comprising said body which is either of a light-reflecting material or is coated with a light-reflecting material, and the optical element includes said surface which comprises said faceted structure, wherein in a case of the body being a body which includes at least one substantially light-reflecting surface then either (a) that reflective surface is said surface with said faceted structure, or (b) that reflective surface is other than said surface with said faceted structure.

6. The optical arrangement according to claim 1, wherein the body of the optical element comprises one face or facial surface which carries or has formed thereon or therein said faceted structure, with an opposite non-faceted face or facial surface of the body not carrying or having formed thereon or therein said faceted structure, and
wherein said non-faceted face or facial surface of the body is substantially flat or planar, or alternatively is curved or arcuate whilst being locally substantially flat or planar at any given point thereon.

7. The optical arrangement according to claim 1, wherein the light source is an elongated linear light source, with longitudinal axes or directions of the optical element and the elongated linear light source being generally substantially parallel to one another, and wherein overall optical function(s) of the optical element are substantially invariant in the direction of the elongation axis of the linear light source.

8. The optical arrangement according to claim 1, wherein in the optical element the faceted structure comprises the plurality of primary facets wherein each of which is configured so as to have or exhibit a surface relief maximum width (namely a maximum width in a direction generally longitudinally along the respective strip or row) in a range of from about 100 or 200 or 300 or 400 or 500 or 1000 or 5000 nm up to about 10 or 20 or 30 or 40 or 50 or 60 or 70 or 80 or 90 or 100, or up to about 200 or 300 or 400 or 500 or 1000 µm.

9. The optical arrangement according to claim 1, wherein in the optical element the faceted structure comprises the plurality of primary facets wherein each of which is configured so as to have or exhibit a surface relief maximum depth or height in a range of from about 0 or 0.5 or 1 or 2 or 3 or 5 or 10 or 20 or 30 or 40 or 50 or 60 or 70 or 80 or 90 or 100 or 150 or 200 or 300 or 400 or 500 nm up to about 2 or 5 or 10 or 20 or 30 or 40 or 50 or 60 or 70 or 80 or 90 or 100, or even up to about 200 or 300 or 400 or 500 µm.

10. The optical arrangement according to claim 1, wherein in the optical element a surface of the body other than, or a surface of the body opposite to, that surface which comprises said faceted structure is substantially flat or planar, or is curved or arcuate so as to be locally flat or planar at any given point thereon.

11. The optical arrangement according to claim 1, wherein in the optical element each strip or row of the faceted structure comprises a generally linear row or sequence or array of a plurality of primary facets which spans substantially the full transverse width, or a major proportion of the transverse width, of the optical element; and
wherein:
either
(i) each said strip or row is generally substantially straight, or
(ii) each said strip or row is curved or arcuate or otherwise non-straight in two or three dimensions.

12. The optical arrangement according to claim 1, wherein in the optical element the or each strip or row of primary facets has a width or maximum width across the strip or row in a range of from about 100 or 200 or 300 or 400 or 500 or 1000 or 5000 nm up to about 25 or 50 or 100 or 200 or 300 or 400 or 500 or 1000 µm.

13. The optical arrangement according to claim 1, wherein in the optical element the faceted structure comprises a plurality of strips or rows each comprising a respective plurality of primary facets, and wherein in the optical element there is defined between adjacent strips or rows a respective border or boundary, and wherein either or both of the following (i) and/or (ii) is present or satisfied:
(i) one or more borders or boundaries between the strips or rows is/are visible, by virtue of the primary facets within one of the adjacent strips or rows being not continuously connected to, nor being continuations of, primary facets within an immediately adjacent strip or row, namely a neighbouring strip or row either immediately thereabove or therebelow;
(ii) one or more borders or boundaries between the strips or rows is/are substantially invisible, by virtue of the primary facets within one of the adjacent strips or rows being continuously connected to, or being continuations of, primary facets within an immediately adjacent strip or row, namely a neighbouring strip or row either immediately thereabove or therebelow, and said one or more invisible borders or boundaries are configured such that the respective neighbouring or adjacent edges of a first primary facet within a first strip or row and of a second primary facet within a second, adjacent strip or row, which first and second strips or rows lie at a common boundary between the said strips or rows, are substantially matched in size and/or position and/or shape at least at, or in the vicinity of or in the respective portions of each primary facet that are located adjacent, that common boundary.

14. The optical arrangement according to claim 1, wherein in the optical element, in any given strip or row of primary facets, substantially all of, or a majority of, the primary facets collectively span substantially a full width of the strip or row and are located next to each other, side by side, along the strip or row.

15. The optical element according to claim 1, wherein in the optical element, in any given strip or row of primary facets:
  (i) some of, or some but not all of, or a minority of, the primary facets span only part of a width of the strip or row and/or are curved or twisted back on themselves, moving along the strip or row, towards one lateral edge of the strip or row; or
  (ii) at least some of, or some but not all of, or a minority of, or substantially all of, the primary facets continuously transition from one to another to form a continuous faceted surface; or
  (iii) at least some of, or some but not all of, or a minority of, or substantially all of, the primary facets transition from one to another with a step or discontinuity, in which case the boundary between any two such neighbouring primary facets of this species are connected by an intermediate connecting or transition surface, and wherein any said intermediate connecting or transition surface either:
    (a) does not perform an optical function that contributes to the prescribed output light distribution pattern; or
    (b) acts on light from said input direction in such a way as to introduce optical noise into, or create diffuse light in, the prescribed output light distribution pattern.

16. The optical arrangement according to claim 1, wherein, in the faceted structure of the optical element, each of the primary facets comprises a curved surface or face, or one that is substantially smooth, and whose shape is defined by either:
  (i) a quadric surface, or a portion of any of an ellipsoid, an elliptic paraboloid, a hyperbolic paraboloid, an elliptic hyperboloid, an elliptic cone, an elliptic cylinder, a hyperbolic cylinder, or a parabolic cylinder; or
  (ii) a, or a portion of a, cylindrical, conical, spherical or bilinear surface, or a flat/planar surface.

17. The optical arrangement according to claim 1, wherein in the optical element the or each of at least one or more of the primary facets of the faceted structure is Fresnellated.

18. The optical arrangement according to claim 1, wherein, in the faceted structure of the optical element, the geometrical properties of each primary facet are such that any given primary facet redirects light emitted by the light source in a respective dominant input direction that reaches that given primary facet into a given one of a plurality of different dominant output directions associated with the primary facets in the faceted structure.

19. The optical arrangement according to claim 1, wherein in the optical element each of the primary facets in the faceted structure redirects light by virtue of substantially only or predominantly a refraction optical function, and substantially without any optical function being diffraction (namely, substantially without any optical function being a phenomenon that would be represented by several primary facets working in tandem in a way corresponding to a diffraction grating).

20. The optical arrangement according to claim 1, wherein in the optical element any given area of the optical element mounted in a luminaire creates a substantial part of the overall prescribed output light distribution pattern, comprising output directions randomly distributed across all, or substantially all, or at least some of or a major proportion of or most of, the output directions within the output light distribution pattern, where said area is larger than an average area of a primary facet within that area of the optical element.

21. The optical arrangement according to claim 1, wherein the optical element is laminated, glued or attached onto another, secondary, optical component in the form of a secondary plate, sheet, layer, film, foil, substrate, or cover component, wherein said optical element and said secondary optical component form a unified composite optical element which still constitutes said optical element of the arrangement of claim 1, and
  wherein said secondary optical component has an optical function of its own which imparts a secondary or auxiliary optical function to the final output light distribution pattern achieved by use of said unified composite optical element.

22. A luminaire comprising:
  at least one optical arrangement according to claim 1; and
  a frame or body or housing within which the various other components of the luminaire are mounted or housed;
  wherein the optical element of the arrangement and/or the luminaire frame, body or housing further comprises one or more engagement or interengagement means, or attachment or connection features, to enable the optical element's attachment or connection to the luminaire frame, body or housing such that the predetermined location of the light source relative to the optical element is automatically ensured for that optical element.

23. A method of producing an optical element being an optical element as defined in the optical arrangement according to claim 1, the method comprising:
  (a) calculating the shape and configuration of each primary facet of the faceted structure such that, for any given strip or row of primary facets:
    (i) each respective primary facet within the given strip or row is configured such that it redirects light from a respective input direction associated with that primary facet into a respective output direction associated with that primary facet;
    (ii) each respective primary facet within the given strip or row is configured such that light propagating therefrom in said respective output direction associated with that primary facet contributes to the prescribed output light distribution pattern; and
    (iii) the respective primary facets within the given strip or row are configured such that:
      the distribution of the respective output directions associated with the respective primary facets in the given strip or row has a random or quasi-random character with respect to the positions of the respective primary facets in the given strip or row, and
      the random or quasi-random character of the distribution of the respective output directions associated with the respective primary facets in the given strip or row is defined by a probability density function correlating with the prescribed output light distribution pattern and not with the positions of the respective primary facets in the given strip or row; and (b) manufacturing the optical element with the primary facets of the faceted structure being according to the said calculated shape and configuration thereof.

\* \* \* \* \*